US012664426B2

(12) United States Patent
Spiers et al.

(10) Patent No.:  US 12,664,426 B2
(45) Date of Patent:     Jun. 23, 2026

(54) METHOD FOR FORCE INFERENCE OF A SENSOR ARRANGEMENT, METHODS FOR TRAINING NETWORKS, FORCE INFERENCE MODULE AND SENSOR ARRANGEMENT

(71) Applicant: MAX-PLANCK-GESELLSCHAFT ZUR FÖRDERUNG DER WISSENSCHAFTEN E. V., Munich (DE)

(72) Inventors: Adam Spiers, Stuttgart (DE); Hyosang Lee, Stuttgart (DE); Georg Martius, Tübingen (DE); Huanbo Sun, Tübingen (DE); Jonathan Fiene, Stuttgart (DE)

(73) Assignee: MAX-PLANCK-GESELLSCHAFT ZUR FÖRDERUNG DER WISSENSCHAFTEN E. V., Munich (DE)

( * ) Notice: Subject to any disclaimer, the term of this patent is extended or adjusted under 35 U.S.C. 154(b) by 304 days.

(21) Appl. No.: 18/038,567

(22) PCT Filed: Nov. 24, 2020

(86) PCT No.: PCT/EP2020/083261
§ 371 (c)(1),
(2) Date: May 24, 2023

(87) PCT Pub. No.: WO2022/111799
PCT Pub. Date: Jun. 2, 2022

(65) Prior Publication Data
US 2023/0306261 A1     Sep. 28, 2023

(51) Int. Cl.
*G06N 3/08*        (2023.01)
*G01L 5/22*        (2006.01)
*G05B 19/4155*     (2006.01)

(52) U.S. Cl.
CPC .......... *G06N 3/08* (2013.01); *G05B 19/4155* (2013.01); *G01L 5/226* (2013.01); *G05B 2219/50391* (2013.01)

(58) Field of Classification Search
CPC ...... G06N 3/08; G06N 3/045; G05B 19/4155; G05B 2219/50391; G01L 5/226; G01L 5/228; G01L 1/205
See application file for complete search history.

(56) References Cited

U.S. PATENT DOCUMENTS 6,037,703  A       3/2000  Kambe et al.
11,137,311  B2*  10/2021  Di Leo  ............... G01L 19/0618
(Continued)

FOREIGN PATENT DOCUMENTS

CN          101344935 B       4/2011
CN          102928137 A       2/2013
(Continued)

OTHER PUBLICATIONS

Ha et al. ,Use of Deep Learning for Position Estimation and Control of Soft Glove, 2018 (Year: 2018).*
(Continued)

*Primary Examiner* — Mohammad K Islam
(74) *Attorney, Agent, or Firm* — REISING ETHINGTON, P.C.

(57)              ABSTRACT

The disclosure relates to a method for force inference of a sensor arrangement for sensing forces, the method including the steps of reading out pressure values and calculating a force map using a feed-forward neural network. The disclosure relates further to corresponding methods for training neural networks, to a force inference module and to a sensor arrangement.

19 Claims, 13 Drawing Sheets

(56) References Cited

U.S. PATENT DOCUMENTS

| | | | | |
|---|---|---|---|---|
| 11,300,397 | B2 * | 4/2022 | Kim | G01L 1/2231 |
| 11,662,228 | B2 | 5/2023 | Kwok et al. | |
| 2005/0241409 | A1 * | 11/2005 | Taylor | G01L 1/205 |
| | | | | 73/841 |
| 2010/0131101 | A1 * | 5/2010 | Engeberg | A61F 2/583 |
| | | | | 700/258 |
| 2010/0261530 | A1 | 10/2010 | Thomas et al. | |
| 2012/0179070 | A1 * | 7/2012 | Pommer | A61B 5/6848 |
| | | | | 600/594 |
| 2012/0286847 | A1 * | 11/2012 | Peshkin | G06F 3/0446 |
| | | | | 327/517 |
| 2015/0166072 | A1 * | 6/2015 | Powers | B60W 40/076 |
| | | | | 701/1 |
| 2016/0034088 | A1 * | 2/2016 | Richards | G01L 1/14 |
| | | | | 345/173 |
| 2017/0031503 | A1 * | 2/2017 | Rosenberg | G06F 3/045 |
| 2020/0201433 | A1 | 6/2020 | Emokpae | |
| 2020/0300598 | A1 | 9/2020 | Kim et al. | |
| 2020/0301510 | A1 * | 9/2020 | Birchfield | G01L 5/009 |
| 2022/0198786 | A1 * | 6/2022 | Jang | G06N 3/0895 |
| 2022/0270297 | A1 * | 8/2022 | Koh | G06N 3/0464 |
| 2023/0154055 | A1 * | 5/2023 | Besenbruch | G06N 3/092 |
| | | | | 375/240.03 |

FOREIGN PATENT DOCUMENTS

| | | | |
|---|---|---|---|
| CN | 110633486 | A | 12/2019 |
| CN | 110837301 | A | 2/2020 |
| CN | 111079333 | A | 4/2020 |
| CN | 111272334 | A | 6/2020 |
| CN | 111721470 | A | 9/2020 |
| WO | WO2009023334 | A2 | 2/2009 |
| WO | WO2020010328 | A1 | 1/2020 |
| WO | WO2020190311 | A1 | 9/2020 |

OTHER PUBLICATIONS

Osborn ,Reflex: A Closed-Loop Tactile Feedback System for Use in Upper Limb Prosthesis Grip Control, 2014 (Year: 2014).*

International Search Report for International Application No. PCT/EP2020/083261 dated Aug. 20, 2021 (4 pages).

Written Opinion for International Application No. PCT/EP2020/083261 dated Aug. 20, 2021 (7 pages).

TakkTile Sensors, RightHand Labs, 2020 by RightHand Robotics, Inc., URL: Accessed May 30, 2023, www.labs.righthandrobotics.com/takktile-sensors.

ReFlex Hand, RightHand Labs, 2020 by RightHand Robotics, Inc., URL: Accessed May 30, 2023, www.labs.righthandrobotics.com/reflexhand.

SynTouch, 2008—2023 SynTouch Inc., URL: Accessed May 30, 2023, syntouchinc.com.

Huanbo Sun and Georg Martius, Machine Learning for Haptics: Inferring Multi-Contact Stimulation from Sparse Sensor Configuration, Frontiers in Neurorobotics, Jul. 10, 2019 (10 pages).

Japanese Office Action for Japanese Patent Application No. 2023-530868; dated Nov. 26, 2024 (3 pages).

English Translation of Japanese Office Action for Japanese Patent Application No. 2023-530868; dated Nov. 26, 2024 (3 pages).

Yaroslav Tenzer, Leif P. Jentoft, and Robert D. Howe, The Feel of MEMS Barometers, Inexpensive and Easily Customized Tactile Array Sensors, IEEE Robotics & Automation Magazine, Sep. 2014 (7 pages).

Pedro Piacenza, Sydney Sherman , and Matei Ciocarlie, Data-Driven Super-Resolution on a Tactile Dome, IEEE Robotics and Automation Letters, vol. 3, No. 3, Jul. 2018 (8 pages).

European Office Action for European Application No. 20816134.9 dated Jul. 31, 2025 (6 pages).

English Translation of Japanese Office Action for Japanese Application No. 2023530868 dated Sep. 29, 2025 (2 pages).

Chinese Office Action for Chinese Application No. 202080107286.7 dated Mar. 24, 2026 (20 pages).

English Translation of Japanese Office Action for Japanese Patent Application No. 2023-530868 dated Mar. 31, 2026 (3 pages).

* cited by examiner

FIG. 6

METHOD FOR FORCE INFERENCE OF A SENSOR ARRANGEMENT, METHODS FOR TRAINING NETWORKS, FORCE INFERENCE MODULE AND SENSOR ARRANGEMENT

INTRODUCTION

The present disclosure relates to a method for force inference of a sensor arrangement, to related methods for training of networks, to a force inference module for performing such methods, and to a sensor arrangement for sensing forces.

When developing applications such as robots, sensing of forces applied on a robot hand or another part of a robot such as a leg or a manipulation device is crucial in giving robots increased capabilities to move around and/or manipulate objects. Known implementations for sensor arrangements that can be used in robotic applications in order to have feedback with regard to applied forces are quite expensive and do not have sufficient resolution.

Sensor arrangements may be used to measure forces. However, known sensor arrangements need high density of sensors to provide for high special resolution.

SUMMARY

It is thus an object per at least some embodiments of the present disclosure to provide for a method for force inference of a sensor arrangement and related methods that are different or optimized with regard to the prior art. It is a further object per at least some embodiments to provide for a force inference module to perform such methods. It is a further object per at least some embodiments to provide for a sensor arrangement for sensing forces with such a force inference module.

The objects are achieved, per at least some embodiments, with the subject-matter of the main claims. Preferred embodiments can, for example, be derived from the dependent claims. The content of the claims is made a content of the description by explicit reference.

The disclosure relates to a method for force inference of a sensor arrangement for sensing forces.

Such a sensor arrangement, especially a sensor arrangement for which the method can be used, may especially comprise a plurality of barometric pressure sensors. It may further comprise a compliant layer. The compliant layer may especially cover the barometric pressure sensors and provide a measurement surface. For example, such a sensor arrangement for which the inventive method can be used may be a sensor arrangement as described herein or can be manufactured according to a method as described herein. With regard to the sensor arrangement or the method of manufacturing, all disclosed embodiments and variations can be used.

The method for force inference comprises the following steps:

reading out pressure values from the barometric pressure sensors, and calculating a force map on the measurement surface based on the pressure values using a feed-forward neural network, the force map comprising a plurality of force vectors.

Using such a method, force inference of a sensor can be performed in a way that high resolution and/or sophisticated information can be obtained with barometric pressure sensors. This is possible because it has been found that a feed-forward neural network can give force information with a much finer resolution than the spacing of the barometric pressure sensors. It can even provide for further information. This functionality can especially be obtained if the feed-forward neural network was trained properly. Preferred implementations, per at least some embodiments, for training are given further below.

The barometric pressure sensors can especially be adapted to generate an output signal that is dependent, e.g. linearly dependent on a pressure applied on the specific barometric pressure sensor. Especially, the pressure is relayed from the measurement surface to the barometric pressure sensor, wherein typically even a force applied with minimal extension on the measurement surface is relayed to several barometric pressure sensors so that techniques like the feed-forward neural network can be used in order to get a fine resolution.

With regard to the sensor arrangement, reference is made to the detailed description, including description of embodiments and variations, given herein.

The force map may especially be a map that is defined on the real measurement surface, wherein the force map may comprise a number of map points. At each map point, some information may be defined, for example a force vector as described further below. The force map typically gives information about forces that are applied on the measurement surface. For example, such forces may originate from an indenter or several indenters pressing on the measurement surface or from an object that is currently manipulated by the sensor arrangement, e.g. when the sensor arrangement is a robot tip.

According to an implementation, the feed-forward neural network comprises a transfer network and a reconstruction network. The transfer network maps the barometric pressure sensors to a plurality of virtual sensors of a finite element model of the sensor arrangement. The reconstruction network maps the virtual sensors of the finite element model to the force map. Each virtual sensor may comprise one or more virtual sensor points, each having a virtual sensor point value.

Thus, the feed-forward neural network is split up in this implementation. This allows for enhanced functionality and especially for better training possibilities, as will be described further below.

The transfer network may especially map the real barometric pressure sensors, or output values originating from the barometric pressure sensors, to the finite element model. The finite element model may especially be a virtual model of the real sensor arrangement. It may especially be used in order to enhance force inference capabilities. The finite element model may be modelled using finite element methods. It may comprise a virtual representation of the used real components and material. For example, Young's Modulus and Poisson's Ratios of used materials may be used identical to the real sensor arrangement. Also, distances and other geometrical dimensions may be identical between the real sensor arrangement and the virtual finite element model. However, it should be noted that the finite element model is a component that is primarily used for training and does not necessarily have to be implemented in an implementation that is only used for force inference after training has been done. If training has been done, the transfer network and the reconstruction network can be used separately from the complete finite element model, wherein in each case a force inference should be done, i.e. a force map should be obtained, output values read out from the barometric pressure sensors are first mapped to the virtual sensor point values by the transfer network, and the virtual sensor point values thus obtained are mapped to the force map by the reconstruction network.

Typically, the transfer network and the reconstruction network are artificial neural networks. Mapping may especially mean that the input values are fed into the network, and the network generates output values based on its training. The training may adapt a plurality of values that define the behaviour of the network. For example, about 1 Million of numerical values can be used in order to define the behaviour of a network. In the case of the transfer network, it may be fed with data originating from the barometric pressure sensors, and it may generate virtual sensor point values. In the case of the reconstruction network, it may be fed with the virtual sensor point values, and it may generate the force map. The entire feed-forward neural network, being split or not, may be fed with data originating from the barometric pressure sensors, and it may generate the force map.

A virtual sensor may be considered as a segmentation of a real sensor into the sensor points. While a real sensor, e.g. a barometric pressure sensor, may convert one force applied on it into one output signal, a virtual sensor may convert such a force into a plurality of sensor point values. Typically, the sensor point values are positioned in a region of the finite element model corresponding to a barometric pressure sensor in the real sensor arrangement. The region in the finite element model may also be smaller or larger, for example 10% or 50% smaller or larger. The virtual sensor concept also takes account of the fact that a barometric pressure sensor is typically not positioned at a point whose position is known with sufficient accuracy to use the exact position in force inference. The use of the finite element model with the virtual sensor points allows for reliable force inference despite such variations.

In the following, training aspects of the networks will be described. The steps for training mentioned in this section are especially to be considered as steps that have been performed before force inference of real force measurements is performed. Thus, the method for force inference can be considered as a combination of training steps performed before the force inference, and the force inference using a trained network or trained networks. The method for force inference can also be considered as the force inference itself, using a network or networks that have been trained accordingly. Further below, separate training methods are described. They can be performed independently from any force inference. The force inference in which typically the barometric pressure sensors are read out and a force map is generated is to be considered as the action to be performed in a use case, i.e. when the sensor arrangement is to be used for measuring or evaluating forces applied on the measurement surface, for example because the sensor arrangement is currently manipulating an object or is otherwise in contact with an object applying pressure on the measurement surface.

According to an implementation, the reconstruction network may have been trained with the following steps performed before the force inference:

performing a plurality of simulations in the finite element model, each simulation comprising simultaneous application of one or more simulated forces on a simulated measurement surface of the finite element model, thereby calculating a simulated force map on the simulated measurement surface, the simulated force map comprising a plurality of simulated force vectors, and calculating, with the finite element model, corresponding virtual sensor point values, and training the reconstruction network with the calculated simulated force maps and the corresponding calculated virtual sensor point values.

Such training steps for the reconstruction network may be used in order to properly train the reconstruction network such that it can generate a correct and fine force map, which is typically the intended output of the sensor arrangement, out of virtual sensor point values. The virtual sensor point values can especially be obtained by a transfer network.

It has been proven suitable to use only simulations for training the reconstruction network. Especially, such simulations may be used in order to train the reconstruction network in a way that it can not only detect one force, but also a plurality of forces applied on the measurement surface. This is much easier than training a network with real force tests, where simultaneously applying two or more forces is complicated because of collision avoidance problems and complex experimental setup. It has been shown that high reliability can be obtained for reconstruction of the force map just by using simulations for training the reconstruction network. The simulations may especially be performed in a computer or in another programmable and/or automatic data processing entity.

A training in the finite element model may especially be performed by pure computer simulation. A simulated force is thus also only applied in such a computer simulation. The simulated measurement surface is typically the surface of the finite element model, e.g. of the compliant layer of the finite element model. Thus, the simulated measurement surface is also only present in simulation, whereas the measurement surface is the surface of the real sensor arrangement.

The simulated forces are applied in a simulation on the simulated measurement surface. This leads to formation of a simulated force map. The simulated force map comprises a plurality of simulated force vectors, wherein each simulated force vector gives a local value of the simulated force map. The simulated force map can represent and/or can be calculated as a deformation of the simulated measurement surface. It can especially be calculated using finite element methods.

The virtual sensor point values may be calculated also by finite element methods. Especially, the simulated forces and the structural and material characteristics of the finite element model, representing the real sensor arrangement, may determine both the simulated force map and the virtual sensor point values. This gives a relation between the simulated force map and the virtual sensor point values.

In force inference, the virtual sensor point values may be generated based on data of the barometric pressure sensors, that indirectly measure real forces. With the relation between the virtual sensor point values and the simulated force map that can be obtained from simulations, the force map can be reconstructed by the reconstruction network.

It should be noted that generating a force map out of virtual sensor point values is denoted as reconstruction. For that reason, the network performing such reconstruction is denoted as reconstruction network.

When training the reconstruction network, data from the simulations performed may be used. Such data may especially comprise a simulated force map and corresponding virtual sensor point values.

According to an implementation, the simulated forces applied on the simulated measurement surface are generated based on respective simulated indenters with simulated indenter shapes. The shape may especially relate to the part of the simulated indenter contacting the simulated measurement surface in simulation. Thus, the simulated indenter is an object used in simulation to define the simulated forces.

According to an implementation, the simulated indenter shapes are selected out of a group comprising at least of tip, round, triangular cross section, square cross section, hemisphere, cube, and cylinder. Such simulated indenter shapes have been proven suitable, as they correspond to typical shapes of real objects that contact the measurement surface in application. Using such different indenter shapes significantly improves training of the reconstruction network in order to reconstruct corresponding or similar shapes applied on a real measurement surface. It should be noted that each mentioned shape can be used, only one mentioned shape can be used, or a selection of the mentioned shapes can be used. Alternatively, or in addition, other shapes can be used. When more than one indenter is used in a simulation, the indenters may have identical or different shapes.

According to an implementation, the reconstruction network was trained using a plurality of different simulated indenter shapes. This allows for training of the reconstruction network such that forces generated by different indenter shapes may be differentiated. Especially, one simulation or several simulations can be done with each used indenter shape or with each used combination of indenter shapes. Such simulations can, for example, differ in the number of indenters and/or in positions where the indenter or the indenters is/are applied.

According to an implementation, the reconstruction network was trained using a plurality of sizes of simulated indenters. In addition, or as an alternative to using different shapes, this allows for training the reconstruction network to differentiate indenters or other objects applying forces with different sizes. For example, different sizes of contact portions to the simulated measurement surface can be used. The statements relating to performing of simulations given with respect to using different indenter shapes apply accordingly. Also, a combination of varying indenter shapes and indenter sizes is possible.

According to an implementation, the reconstruction network was trained with at least a part of the simulations comprising simultaneous application of simulated forces generated based on two or more simulated indenters. This allows training the reconstruction network for differentiating between forces applied by only one indenter and forces applied by two or more indenters. This can especially be done in simulation, which is much easier than preparing an experimental setup for performing such application of two or more indenters.

According to an implementation, the reconstruction network was trained with at least a part of the simulations comprising application of simulated forces generated based on only one simulated indenter. This allows specific training for reconstruction of a force map when only one indenter is applied.

For example, the following numbers of simulations can be performed in a typical training.

When training the reconstruction network with single contact, 10,000 to 50,000, or 30,000, simulations can be performed.

When training the reconstruction network with double contact, 5,000 to 20,000, or 10,000, simulations can be performed.

When training the reconstruction network with triple contact, 5,000 to 20,000, or 10,000, simulations can be performed.

When training the reconstruction network with quadruple contact, 5,000 to 20,000, or 10,000, simulations can be performed.

When training the reconstruction network with quintuple contact, 5,000 to 20,000, or 10,000, simulations can be performed.

However, these are only typical or preferred values. In general, any number of simulations can be performed. For example, double contact means simultaneous application of two forces, triple contact means simultaneous application of three forces, quadruple contact means simultaneous application of four forces and quintuple contact means simultaneous application of five forces. Such simulations can be combined when training.

According to an implementation, each of the simulated force vectors comprises a normal force component, a first shear force component and a second shear force component. Thus, the force map gives information about these components. It should be noted that in typical implementations according to the prior art, no shear forces could be reconstructed. However, it has been shown that when such simulated force vectors with the mentioned components are used for training the reconstruction network with simulations, shear forces can be reconstructed in addition to the normal forces. This gives additional information, which is of value in a plurality of applications, e.g. in robotic applications for manipulating objects.

According to an implementation, of the simulated force vectors, the first shear force component corresponds to a first shear force and the second shear force component corresponds to a second shear force. Especially, the first shear force is perpendicular to the second shear force. This provides for an easily usable information due to perpendicular orientation of the shear forces.

It should be noted that the force vectors can alternatively also have more or less than three components.

According to an implementation, the reconstruction network was trained using a plurality of simulated forces having different shear force components. This allows training the reconstruction network for differentiating different shear forces applied on the measurement surface. Shear forces can vary between different components of forces used in one simulation and/or between different simulations.

According to an implementation, the reconstruction network was trained using a plurality of simulated forces having different normal force components. This allows training the reconstruction network for differentiating different normal forces applied on the measurement surface. Normal forces can vary between different forces used in one simulation and/or between different simulations.

It should be noted that the concept of using different simulated indenters, different simulated indenter shapes, different simulated indenter sizes and/or different simulated shear forces or different simulated shear force components can also be applied in other contexts when training a neural network for force inference purposes. This is independent of the implementation of a sensor arrangement given herein. The same is true for real indenters and/or forces.

According to an implementation, the transfer network may have been trained with the following steps performed before the force inference:

performing a plurality of force tests on the sensor arrangement, each force test comprising application of a force by one indenter on a position on the measurement surface of the sensor arrangement, simultaneously measuring a force applied by the indenter and simultaneously measuring pressure values with the barometric pressure sensors, for each force test, performing a corresponding simulation with the finite element model, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and calculating, with the finite element model, corresponding virtual sensor point values, and training the transfer network with the measured pressure values and the corresponding calculated virtual sensor point values.

A force test is a test performed with a real physical sensor arrangement, in contrast to a simulation. The indenter may be an object specifically designed to contact the measurement surface. The force test may be performed such that the sensor arrangement is moved against a stationary indenter, or such that the indenter is moved against a stationary sensor arrangement. Also, movement of both the sensor arrangement and the indenter can be applied. The force may be measured during application of the indenter and may form the basis for a simulated force applied in the simulation. It has been proven suitable to measure the force instead of trying to apply a specifically defined force, because the latter approach is more complicated, even though it is possible. The pressure values are typically output signals of the barometric pressure sensors.

It should especially be noted that it has been found that it is not necessary to perform force tests with multiple indenters applied at the same time in order to prepare the feedforward neural network for correctly evaluating multiple forces. This can be done by simulations for training the transfer network, as described above.

The simulations for training the transfer network can especially be performed with the same finite element model that is used for the simulations for training the reconstruction network.

In the simulations, the simulated force and the structural and material characteristics of the finite element model are typically the basis for the calculations performed with the finite element model. Especially, the simulated force leads to a calculated simulated force map and to calculated virtual sensor point values. The finite element model is thus used to calculate virtual sensor point values that correspond to the force actually applied on the measurement surface.

The simulated force may especially correspond to the real measured force, e.g. it can have the same components, the same absolute value and/or the same orientation. Especially, the simulated force may have an integral over a contact area of a simulated indenter applying the simulated force on the simulated measurement surface that is equal to or has a predefined relation to the measured force or an integral of the real and/or measured force over a real contact area. This can, for example, relate to amplitude and/or direction of the forces. Also predefined variations between the measured force and the simulated force can be used, which can also be regarded as corresponding forces.

The position can, for example, be measured, gained from image recognition using a camera, or can be calculated from machine parameters when doing the force tests. The simulated force may especially be applied on the same position of the simulated measurement surface as the position on the real measurement surface on which the real force is applied. This gives good correspondence between experiment and simulation.

When training the transfer network, both experimental and simulation data may be used. Such simulation data may especially comprise pressure values of the barometric pressure sensors and virtual sensor point values from the corresponding simulation.

According to an implementation, the force tests for training the transfer network are performed with a plurality of indenters each having a respective indenter shape. The shape may especially relate to the part of the indenter contacting the measurement surface in the force test. Thus, the indenter is an object used in the force test to define the force applied on the measurement surface. Especially, a plurality of force tests can be done, wherein one out of a group of indenter shapes is used in each force test. Typically, only one indenter is used in each force test.

According to an implementation, the indenter shapes are selected out of a group comprising at least of tip, round, triangular cross section, square cross section, hemi-sphere, cube, and cylinder. Such indenter shapes have been proven suitable, as they correspond to typical shapes of objects that contact the measurement surface in application. Using such different indenter shapes significantly improves training of the transfer network in order to reconstruct corresponding or similar shapes applied on the measurement surface. It should be noted that each mentioned shape can be used, only one mentioned shape can be used, or a selection of the mentioned shapes can be used. Alternatively, or in addition, other shapes can be used.

According to an implementation, the simulations are performed with simulated forces based on simulated indenters with respective simulated indenter shapes corresponding to real indenter shapes used in the corresponding force test. This ensures optimal correspondence between force test and simulation, so that the transfer network may be ideally trained.

According to an implementation, the transfer network was trained using a plurality of different indenter shapes. This allows for training of the transfer network such that forces generated by different indenter shapes may be differentiated. Typically, the different indenter shapes are distributed over a plurality of force tests, because only one indenter is applied in each force test.

According to an implementation, the transfer network was trained using a plurality of indenters with different sizes. In addition, or as an alternative to using different shapes, this allows training the transfer network to differentiate indenters or other objects applying forces with different sizes. For example, different sizes of contact portions to the measurement surface can be used.

According to an implementation, the transfer network was trained with the indenters, at least for a part of the force tests for training the transfer network, being applied with respective shear forces. This allows training the transfer network in order to differentiate different shear forces applied on the measurement surface. Especially, a plurality of force tests can be performed with different shear forces or shear force components.

According to an implementation, the measured forces each comprise a normal force component, a first shear force component and a second shear force component. Thus, a measured force gives information about these components. It should be noted that in typical implementations according to the prior art, no shear forces could be measured. However, it has been shown that when such simulated force vectors with the mentioned components are used for training the transfer network with force tests, shear forces can be reconstructed in addition to the normal forces. This gives additional information, which is of value in a plurality of applications, e.g. in robotic applications for controlling a robotic tip.

According to an implementation, of the measured forces, the first shear force component corresponds to a first shear force and the second shear force component corresponds to a second shear force. Especially, the first shear force is perpendicular to the second shear force. This provides for an easily usable information due to perpendicular orientation of the shear forces.

It should be noted that the measured forces can alternatively also have more or less than three components.

The measured forces may be represented in a global coordinate system. They may also be represented with a normal component being locally perpendicular to the measurement surface at a contact point, with shear forces being perpendicular to the normal component and/or to each other. This is to be seen as equivalent, because a coordinate transformation can be used to calculate components in another coordinate system.

According to an implementation, the transfer network was trained using a plurality of forces having different shear force components. This allows training the transfer network for differentiating different shear forces applied on the measurement surface. Shear forces can vary between different components of the force used in one force test and/or between different force tests.

According to an implementation, the transfer network was trained using a plurality of forces having different normal force components. This allows training the transfer network for differentiating different normal forces applied on the measurement surface. Normal forces can especially vary between different force tests and corresponding simulations.

According to an implementation, the forces applied by the indenter are measured using a force sensor in the indenter or positioned adjacent to the indenter. Such a force sensor may measure the force applied on the measurement surface by the indenter. It may especially measure three components of the force, for example as discussed above. Positioning the force sensor adjacent to the indenter may especially comprise positioning it such that it contacts the indenter and/or such that it is positioned between the indenter and an object mounting the indenter.

According to an implementation, each of the simulated force vectors comprises a normal force component, a first shear force component and a second shear force component. This may especially correspond to the measured force. Thus, a simulated force can be used for the simulation corresponding to the real applied force in the force test.

According to an implementation, the feed-forward neural network directly maps the barometric pressure sensors to the force map. This may be regarded as an alternative implementation to splitting the feed-forward neural network into a transfer network and a reconstruction network. Especially, in this implementation no mapping of pressure values to virtual sensor point values is used. Instead, there is only one neural network that is trained and maps the pressure values directly to the force map.

For example, between 20 and 100 force tests and corresponding simulations, or 50 force tests and corresponding simulations, can be performed in order to train the transfer network properly.

As further examples, at least 20 force tests, at least 50 force tests, at least 100 force tests, at least 500 force tests, at least 1,000 force tests, at least 2,000 force tests or at least 10,000 force tests and/or at most 500 force tests, at most 1,000 force tests, at most 2,000 force tests, at most 10,000 force tests or at most 50,000 force tests can be performed. However, also other numbers may be used.

The force tests can especially be performed in a way that the force is not predetermined but is measured in each case. Different apparatus parameters can be used in order to obtain different forces.

According to an implementation, the feed-forward neural network may have been trained with the following steps performed before the force inference:

performing a plurality of force tests on the sensor arrangement, each force test comprising application of a force by one indenter on a position on the measurement surface of the sensor arrangement, simultaneously measuring a force applied by the indenter and simultaneously measuring pressure values with the barometric pressure sensors, for each force test, performing a corresponding simulation with a finite element model of the sensor arrangement, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the measured pressure values and the corresponding calculated simulated force maps.

Such a training can also be performed when there are no virtual sensor point values used. It can be used, for example, in an implementation in which the feed-forward neural network directly maps the pressure values to the force map, as discussed above. However, it can also be used in the implementation with the splitting of the feed-forward neural network into a transfer network and a reconstruction network as discussed above, especially in addition to separately training the transfer network and the reconstruction network.

Regarding details of the force test and the simulation, reference is made to the statements given above with respect to training of the transfer network and training of the reconstruction network.

According to an implementation, the force tests for training the feed-forward neural network are performed with a plurality of indenters each having a respective indenter shape. The shape may especially relate to the part of the indenter contacting the measurement surface in the force test. Thus, the indenter is an object used in the force test to apply the force on the measurement surface.

According to an implementation, the indenter shapes are selected out of a group comprising at least of tip, round, triangular cross section, square cross section, hemi-sphere, cube, and cylinder. Such indenter shapes have been proven suitable, as they correspond to typical shapes of objects that contact the measurement surface in application. Using such different indenter shapes significantly improves training of the feed-forward neural network in order to reconstruct corresponding or similar shapes applied on the measurement surface. It should be noted that each mentioned shape can be used, only one mentioned shape can be used, or a selection of the mentioned shapes can be used. Alternatively, or in addition, other shapes can be used.

According to an implementation, the simulations are performed with simulated forces based on simulated indenters with respective simulated indenter shapes corresponding to real indenter shapes used in the corresponding force test. This ensures optimal correspondence between force test and simulation, so that the feed-forward neural network may be ideally trained.

According to an implementation, the feed-forward neural network was trained using a plurality of different indenter shapes. This allows for training of the feed-forward neural network such that forces generated by different indenter shapes may be differentiated.

According to an implementation, the feed-forward neural network was trained using a plurality of indenters with different sizes. In addition, or as an alternative to using different shapes, this allows training the feed-forward neural network to differentiate indenters or other objects applying forces with different sizes. For example, different sizes of contact portions to the measurement surface can be used.

According to an implementation, the feed-forward neural network was trained with the indenter, at least for a part of the force tests for training the feed-forward neural network, being applied with respective shear forces. This allows training the feed-forward neural network in order to differentiate different shear forces applied on the measurement surface. Especially, a plurality of force tests can be performed with different shear forces or shear force components.

According to an implementation, the measured forces each comprise a normal force component, a first shear force component and a second shear force component. Thus, a measured force gives information about these components. It should be noted that in typical implementations according to the prior art, no shear forces could be measured. However, it has been shown that when such simulated force vectors with the mentioned components are used for training the feed-forward neural network with force tests, shear forces can be reconstructed in addition to the normal forces. This gives additional information, which is of value in a plurality of applications, e.g. in robotic applications for controlling a robotic tip.

According to an implementation, of the measured forces, the first shear force component corresponds to a first shear force and the second shear force component corresponds to a second shear force. Especially, the first shear force is perpendicular to the second shear force. This provides for an easily usable information due to perpendicular orientation of the shear forces.

It should be noted that the measured forces can alternatively also have more or less than three components.

According to an implementation, the feed-forward neural network was trained using a plurality of forces having different shear force components. This allows training the feed-forward neural network for differentiating different shear forces applied on the measurement surface. Shear forces can vary between different components of the force used in one force test and/or between different force tests.

According to an implementation, the feed-forward neural network was trained using a plurality of forces having different normal force components. This allows training the feed-forward neural network for differentiating different normal forces applied on the measurement surface. Normal forces can especially vary between different force tests.

According to an implementation, the forces applied by the indenter are measured using a force sensor in the indenter or positioned adjacent to the indenter. Such a force sensor may measure the force applied on the measurement surface by the indenter. It may especially measure three components of the force, for example as discussed above. Positioning the force sensor adjacent to the indenter may especially comprise positioning it such that it contacts the indenter and/or such that it is positioned between the indenter and an object mounting the indenter.

According to an implementation, each of the simulated force vectors comprises a normal force component, a first shear force component and a second shear force component. This may especially correspond to the measured force. Thus, a simulated force can be used for the simulation corresponding to the real applied force in the force test.

In the following, aspects that relate to the actual process of force inference, not primarily to training, are described.

According to an implementation, the pressure values on which a calculated force map is based are read out simultaneously or during a predefined time period. This ensures that all pressure values relate to the same application of a force.

According to typical implementations, the force map comprises at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2.

According to typical implementations, the force map comprises at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2.

Such densities of force vectors have been proven suitable for typical applications, as they provide for sufficient resolution and can be obtained with widely available computational power. Each lower value can be combined with each higher value to form a suitable interval. Also, other densities of force vectors can be used.

According to typical implementations, the force map comprises at least 500, at least 1000, or at least 2000 force vectors. According to typical implementations, the force map comprises at most 1000, at most 2000, at most 3000, or at most 4000 force vectors. Such implementations can, for example, be used in the case of the sensor arrangement being a tip of an approximately human-sized robot.

According to a preferred implementation, each force vector comprises a normal force component, a first shear force component and a second shear force component. This allows for the force map providing suitable three-dimensional information.

Especially, the first shear force component may correspond to a first shear force and the second shear force component may correspond to a second shear force. The first shear force may especially be perpendicular to the second shear force. This allows for suitable shear force information of applied forces given by the force map.

According to an implementation, the method for force inference further comprises reading out temperature values from the barometric pressure sensors and providing temperature information or a temperature map of the sensor arrangement based on the temperature values. This can give additional temperature information, which can be used, for example, in a robotic control application. For example, a temperature measurement functionality present in the barometric pressure sensors can be used for this purpose.

It should be noted that when a method comprises both a force map and a simulated force map, typically the force map relates to the sensor arrangement, and the simulated force map relates to the finite element model. Statements given for one of these force maps can typically be applied for both of these force maps.

In the following, separate methods for training of networks will be described. These methods are not part of a method for force inference, bur are performed separately for training the networks. With regard to the respective features, reference is made to the statements already given above with respect to training of the networks and the method for force inference, in order to avoid repetition.

The disclosure relates to a method for training a reconstruction network, wherein the reconstruction network maps virtual sensors of a finite element model of a sensor arrangement to a force map, the sensor arrangement comprising a plurality of barometric pressure sensors and a compliant layer covering the barometric pressure sensors and providing a measurement surface, the force map comprising a plurality of force vectors, wherein each virtual sensor comprises one or more virtual sensor points, each having a virtual sensor point value, wherein the reconstruction network is trained with the following steps:

performing a plurality of simulations in the finite element model, each simulation comprising simultaneous application of one or more simulated forces on a simulated measurement surface of the finite element model, thereby calculating a simulated force map on the simulated measurement surface, the simulated force map comprising a plurality of simulated force vectors, and calculating, with the finite element model, corresponding virtual sensor point values, and training the reconstruction network with the calculated simulated force maps and the corresponding calculated virtual sensor point values.

According to an implementation, the simulated forces applied on the simulated measurement surface are generated based on respective simulated indenters with simulated indenter shapes.

According to an implementation, the simulated indenter shapes are selected out of a group comprising at least of tip, round, triangular cross section, square cross section, hemisphere, cube, and cylinder.

According to an implementation, the reconstruction network is trained using a plurality of different simulated indenter shapes.

According to an implementation, the reconstruction network is trained using a plurality of sizes of simulated indenters.

According to an implementation, the reconstruction network is trained with at least a part of the simulations comprising simultaneous application of simulated forces generated based on two or more simulated indenters.

According to an implementation, the reconstruction network is trained with at least a part of the simulations comprising application of simulated forces generated based on only one simulated indenter.

According to an implementation, each of the simulated force vectors comprises a normal force component, a first shear force component and a second shear force component.

According to an implementation, of the simulated force vectors, the first shear force component corresponds to a first shear force and the second shear force component corresponds to a second shear force, and wherein the first shear force is perpendicular to the second shear force.

According to an implementation, the reconstruction network is trained using a plurality of simulated forces having different shear force components.

According to an implementation, the reconstruction network is trained using a plurality of simulated forces having different normal force components.

According to an implementation, the reconstruction network is used in a method as described above with respect to using a transfer network and a reconstruction network.

According to respective implementations, the force map comprises at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2, and/or the force map comprises at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2.

According to an implementation, each force vector comprises a normal force component, a first shear force component and a second shear force component.

According to an implementation, the first shear force component corresponds to a first shear force and the second shear force component corresponds to a second shear force, and the first shear force is perpendicular to the second shear force.

The same may be true for the simulated force map and its simulated force vectors.

The disclosure relates to a method for training a transfer network, wherein the transfer network maps barometric pressure sensors of a sensor arrangement to a plurality of virtual sensors of a finite element model of the sensor arrangement, the sensor arrangement comprising a plurality of barometric pressure sensors and a compliant layer covering the barometric pressure sensors and providing a measurement surface, wherein each virtual sensor comprises one or more virtual sensor points, each having a virtual sensor point value, wherein the transfer network is trained with the following steps:

performing a plurality of force tests on the sensor arrangement, each force test comprising application of a force by one indenter on a position on the measurement surface of the sensor arrangement, simultaneously measuring a force applied by the indenter and simultaneously measuring pressure values with the barometric pressure sensors, for each force test, performing a corresponding simulation with the finite element model, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and calculating, with the finite element model, corresponding virtual sensor point values, and training the transfer network with the measured pressure values and the corresponding calculated virtual sensor point values.

According to an implementation, the force tests for training the transfer network are performed with a plurality of indenters each having a respective indenter shape.

According to an implementation, the indenter shapes are selected out of a group comprising at least of tip, round, triangular cross section, square cross section, hemi-sphere, cube, and cylinder.

According to an implementation, the simulations are performed with simulated forces based on simulated indenters with respective simulated indenter shapes corresponding to real indenter shapes used in the corresponding force test.

According to an implementation, the transfer network is trained using a plurality of different indenter shapes.

According to an implementation, the transfer network is trained using a plurality of indenters with different sizes.

According to an implementation, the transfer network is trained with the indenters, at least for a part of the force tests for training the transfer network, being applied with respective shear forces.

According to an implementation, the measured forces each comprise a normal force component, a first shear force component and a second shear force component.

According to an implementation, of the measured forces, the first shear force component corresponds to a first shear force and the second shear force component corresponds to a second shear force, and wherein the first shear force is perpendicular to the second shear force.

According to an implementation, the transfer network is trained using a plurality of forces having different shear force components.

According to an implementation, the transfer network is trained using a plurality of forces having different normal force components.

According to an implementation, the forces applied by the indenter are measured using a force sensor in the indenter or positioned adjacent to the indenter.

According to an implementation, each of the simulated force vectors comprises a normal force component, a first shear force component and a second shear force component.

According to an implementation, the transfer network is used in a method as described above with respect to using a transfer network and a reconstruction network.

The disclosure relates to a method for training a feed-forward neural network, wherein the feed-forward neural network calculates a force map on a measurement surface of a sensor arrangement based on pressure values of barometric pressure sensors, the sensor arrangement comprising a plurality of barometric pressure sensors and a compliant layer covering the barometric pressure sensors and providing a measurement surface, the force map comprising a plurality of force vectors, wherein the feed-forward neural network is trained with the following steps:

performing a plurality of force tests on the sensor arrangement, each force test comprising application of a force by one indenter on a position on the measurement surface of the sensor arrangement, simultaneously measuring a force applied by the indenter and simultaneously measuring pressure values with the barometric pressure sensors, for each force test, performing a corresponding simulation with a finite element model of the sensor arrangement, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the measured pressure values and the corresponding calculated simulated force maps.

According to an implementation, force tests for training the feed-forward neural network are performed with a plurality of indenters each having a respective indenter shape.

According to an implementation, the indenter shapes are selected out of a group comprising at least of tip, round, triangular cross section, square cross section, hemi-sphere, cube, and cylinder.

According to an implementation, the simulations are performed with simulated forces based on simulated indenters with respective simulated indenter shapes corresponding to real indenter shapes used in the corresponding force test.

According to an implementation, the feed-forward neural network is trained using a plurality of different indenter shapes.

According to an implementation, the feed-forward neural network is trained using a plurality of indenters with different sizes.

According to an implementation, the feed-forward neural network is trained with the indenters, at least for a part of the force tests for training the feed-forward neural network, being applied with respective shear forces.

According to an implementation, the measured forces each comprise a normal force component, a first shear force component and a second shear force component.

According to an implementation, of the measured forces, the first shear force component corresponds to a first shear force and the second shear force component corresponds to a second shear force, and wherein the first shear force is perpendicular to the second shear force.

According to an implementation, the feed-forward neural network is trained using a plurality of forces having different shear force components.

According to an implementation, the feed-forward neural network is trained using a plurality of forces having different normal force components.

According to an implementation, the forces are measured using a force sensor in the indenter or positioned adjacent to the indenter.

According to an implementation, each of the simulated force vectors comprises a normal force component, a first shear force component and a second shear force component.

According to an implementation, of the simulated force vectors, the first shear force component corresponds to a first shear force and the second shear force component corresponds to a second shear force, and wherein the first shear force is perpendicular to the second shear force.

According to an implementation, the feed-forward neural network is used in a method for force inference as described above.

According to respective implementations, the force map comprises at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2, and/or the force map comprises at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2.

According to an implementation, each force vector comprises a normal force component, a first shear force component and a second shear force component.

According to an implementation, the first shear force component corresponds to a first shear force and the second shear force component corresponds to a second shear force, and wherein the first shear force is perpendicular to the second shear force.

In the following, details of a sensor arrangement for which the methods disclosed herein can be applied, are described. Reference is further made to details or explanations of such a sensor arrangement given herein, which can be applied accordingly.

Especially, in a method disclosed herein the sensor arrangement may be a sensor arrangement for sensing forces, the sensor arrangement comprising:

a flexible circuit board, a number of barometric pressure sensors being mounted on the flexible circuit board, a rigid core, which the flexible circuit board is wrapped around and mounted to, so that the flexible circuit board at least partially covers the rigid core with the barometric pressure sensors protruding away from the rigid core, and a compliant layer covering the barometric pressure sensors and providing a measurement surface.

However, it should be noted that the concepts for force inference and training disclosed herein can also be used for other sensor arrangements. This relates especially to the usage of different indenter sizes, different indenter shapes, different shear forces and/or different shear force components. Such concepts can be generalized.

According to an implementation, the rigid core is dome shaped.

According to an implementation, the rigid core has a plurality of facets, wherein each barometric pressure sensor is positioned on one of the plurality of facets.

According to an implementation, the compliant layer comprises or consists of a plastic material or rubber According to an implementation, the plastic material is a thermoplastic, an elastomer, a thermoplastic elastomer or a thermoset.

According to an implementation, the compliant layer relays forces applied on the measurement surface to at least a part of the barometric pressure sensors.

According to an implementation, the barometric pressure sensors are connected by conductor paths on the flexible circuit board.

According to an implementation, the flexible circuit board is asterisk-shaped.

According to an implementation, the flexible circuit board comprises a plurality of arms being connected at a central portion.

According to respective implementations, the barometric pressure sensors are arranged with a distance of at least 1 mm, at least 2 mm, at least 3 mm, at least 4 mm, or at least 5 mm and/or with a distance of at most 1 mm, at most 2 mm, at most 3 mm, at most 4 mm, or at most 5 mm.

According to an implementation, the sensor arrangement is a robot tip and/or a manipulation element of a robot.

According to an implementation, the rigid core is a 3D printed part.

The disclosure further relates to a force inference module for force inference of a sensor arrangement for sensing forces, the force inference module being configured to perform a method as disclosed herein. With regard to the method, all embodiments and variations can be applied.

The disclosure relates to a sensor arrangement for sensing forces, the sensor arrangement comprising one, some or all of the following:

a flexible circuit board, a number of barometric pressure sensors being mounted on the flexible circuit board, a rigid core, which the flexible circuit board is wrapped around and mounted to, so that the flexible circuit board at least partially covers the rigid core with the barometric pressure sensors protruding away from the rigid core, a compliant layer covering the barometric pressure sensors and providing a measurement surface, and a force inference module according to the disclosure.

With regard to the sensor arrangement comprising a force inference module, all embodiments and variations of the force inference module and of the sensor arrangement and its components, especially as described herein, can be applied.

In the following, further inventive aspects are described. Such aspects may be combined, alone or in combination, with other features disclosed herein. They can also be regarded as separate inventive aspects and can be made the subject of claims.

The disclosure relates to a sensor arrangement for sensing forces. The sensor arrangement comprises a flexible circuit board. The sensor arrangement comprises a number of barometric pressure sensors being mounted on the flexible circuit board. The sensor arrangement comprises a rigid core, to which the flexible circuit board is wrapped around and mounted to, so that the flexible circuit board at least partially covers the rigid core with the barometric pressure sensors protruding away from the rigid core. The sensor arrangement further comprises a compliant layer covering the barometric pressure sensors and providing a measurement surface.

Such a sensor arrangement can be manufactured with low cost and provides for a high resolution.

The flexible circuit board is to be understood such that it is flexible when taken alone, especially before being mounted on the rigid core. Such a flexible circuit board is easy to manufacture and easy to handle, which provides for reduced effort and costs. The barometric pressure sensors can be of standard type as used in many industrial or scientific applications. Thus, they are very cheap. Barometric pressure sensors usually provide for an output signal, i.e. a pressure value, that is dependent, for example proportional, on a force applied on the barometric pressure sensor. This can be seen as a definition of a barometric pressure sensor. In a generalization, any pressure sensor can be used.

The rigid core is typically made of a rigid material, for example a plastic material or metal. It provides for stability of the sensor arrangement, especially when a force is applied. Thus, the compliant layer may be deformed in response to an applied force, while the rigid core absorbs the force and provides for a non-deformable reference.

The feature that the flexible circuit board at least partially covers the rigid core typically means that at least a part of the rigid core is covered by the flexible circuit board. Typically, the rigid core may have a surface that is intended for being covered by the flexible circuit board, and the flexible circuit board may partially or fully cover this surface. Thus, the flexible circuit board may leave a part of the surface of the rigid core as being not covered.

Flexibility of the flexible circuit board typically means that it can be bent easily in a state in which it is separate, especially not yet mounted on the rigid core. For example, the flexible circuit board can behave like a piece of cloth or rubber in a separate state.

The flexible circuit board may especially be mounted to the rigid core using a glue or by being screwed. However, also other means of mounting the flexible circuit board to the rigid core may be used.

Typically the barometric pressure sensors are already mounted on the flexible circuit board before the flexible circuit board is mounted on the rigid core.

The flexible circuit board may comprise a number of conductor paths, e.g. electric lines connecting the barometric pressure sensors so that they can be supplied with electrical power and/or can be read out. Usage of the flexible circuit board is a very efficient way to provide for power supply and/or read out capabilities for such barometric pressure sensors being mounted on an individually shaped rigid core, because the electric lines on the flexible circuit board automatically adapt to any required shape.

The compliant layer is especially a layer that is deformable in response to a force applied to the measurement surface. Such a deformation is characteristic for an external force or other parameters like shapes of an indenter or shear forces. The compliant layer may especially be flexible and/or resilient, such that it recovers automatically to a defined shape after application of the force has ceased. The force applied on the measurement surface is typically relayed by the compliant layer to the barometric pressure sensors, especially in such a way that for typical forces applied on the measurement surface a plurality of the barometric pressure sensors are affected by the force. Thus, very high resolution for detection of forces is possible even if the barometric pressure sensors are spaced apart much wider than high-resolution sensors known in the prior art. This is especially due to the fact that more sophisticated force inference techniques can be used, for example based on machine learning and/or artificial neural networks, for example as described in this application. Especially, one single compliant layer may cover all barometric pressure sensors.

According to an embodiment, the rigid core is dome shaped. This can especially be suitable when the sensor arrangement is a tip of a robot or another manipulation element. However, also other shapes can be used. For example, the sensor arrangement can be adapted to design foot sensors, shin sensors, thigh sensors, or breast sensors for a robot. The shape of the rigid core can be adapted accordingly. For example, it can have the shape of a flat plane, a cylinder, or can be random shaped. Typically, the shape is designed such that the contact force can activate multiple barometric pressure sensors at the same time, by which the force can be localized.

The rigid core may especially have a plurality of facets. According to an implementation, each barometric pressure sensor or at least a part of the barometric pressure sensors is positioned on at least one of the plurality of facets. Thus, the orientation of each barometric pressure sensor may be defined by the orientation of the respective facet on which it is positioned. This does not preclude that more than one barometric pressure sensor may be arranged on a respective facet. It is also possible that there are facets or other parts of a surface of the rigid core on which no barometric pressure sensor is mounted.

It should be noted that while the barometric pressure sensors are placed on the flexible circuit board, the flexible circuit board typically adapts to the shape of the facets of the rigid core. Thus, the flexible circuit board forms facets itself.

Especially, the facets can have different orientations, so that measurement of forces in different orientations can be performed.

The compliant layer may comprise or consist of a plastic material or rubber. The plastic material may, for example, be a thermoplastic, an elastomer, a thermoplastic elastomer, or a thermoset or a similar material. Such materials have been proven suitable for typical applications; however, also other materials can be used. Especially, they can be used in the fabrication process of the compliant layer described above.

The compliant layer may especially relay forces applied on the measurement surface to at least a part of the barometric pressure sensors. Especially, it may be configured such that it relays forces to more than one barometric pressure sensor, at least for a part or the majority of the measurement surface. This allows for enhancement of resolution when measuring forces using electronic force inference techniques.

The barometric pressure sensors may especially be connected by conductor paths on the flexible circuit board. These conductor paths may especially be flexible, so that they adapt to a surface of the rigid core automatically when the flexible circuit board is wrapped around. Such conductor paths allow for a reliable and easy connection of the barometric pressure sensors.

The barometric pressure sensors may especially be connected by conductor paths on the flexible circuit board. These conductor paths may especially be flexible, so that they adapt to a surface of the rigid core automatically when the flexible circuit board is wrapped around. Such conductor paths allow for a reliable and easy connection of the barometric pressure sensors.

The flexible circuit board may especially be asterisk-shaped. Especially, it may comprise a plurality of arms or spokes being connected at a central portion. This allows especially for wrapping around the flexible circuit board on a dome-shaped rigid core, as can, for example, be seen from the enclosed drawings.

The barometric pressure sensors may be arranged with a distance of at least 1 mm, at least 2 mm, at least 3 mm, at least 4 mm, or at least 5 mm. They may also be arranged with a distance of at most 1 mm, at most 2 mm, at most 3 mm, at most 4 mm, or at most 5 mm. The distance may be measured between outer surroundings of the barometric pressure sensors. Each two different values can be combined in order to form suitable intervals.

Especially, the sensor arrangement may be a robotic tip and/or a manipulation element of a robot. While this is a preferable application, it should be noted that the sensor arrangement can in principle be used also for a plurality of other applications, especially when a force has to be measured and/or when an element should be used for manipulation. Manipulation especially means that the manipulation element, which can for example be identical to the sensor arrangement, can grasp or catch an item to be manipulated and manipulate this item, for example with respect to its position or orientation. While doing this, forces can be measured using the sensor arrangement.

In general, it can be said that the sensor arrangement as disclosed herein may combine barometric sensing technology with novel assembly methods. It may further be combined with machine learning techniques, for example as disclosed herein, in order to create a high-resolution tactile sensor with a high level of robustness and, for example, with a three-dimensional dome shape.

According to an embodiment, the rigid core is a 3D printed part. This allows for variable and efficient manufacturing. However, also other manufacturing methods can be used, e.g. drilling or moulding.

For example, at least 5, at least 10, at least 15, at least 19, at least 20, at least 25, at least 30, at least 35, or at least 37 barometric pressure sensors can be used. They can be wrapped over a dome-shaped central core. Such an assembly may be placed in a mould where it is covered in material, for example urethane, to provide a flexible outer surface that protects the sensors, while also enabling localized pressure measurements. Typically, barometric pressure sensors are separate elements, so that each barometric pressure sensor can be visually and/or physically distinguished from neighbouring ones.

The disclosure further relates to a method for fabricating a sensor arrangement for sensing forces. The method comprises the following steps:

providing a flexible circuit board with a number of barometric pressure sensors mounted thereon, providing a rigid core, wrapping around and mounting the flexible circuit board on the rigid core, so that the flexible circuit board at least partially covers the rigid core with the barometric pressure sensors protruding away from the rigid core, and covering the barometric pressure sensors with a compliant layer, thereby providing a measurement surface on the compliant layer.

Such a method can especially be used in order to fabricate a sensor arrangement as described before. It should be noted that all statements given with respect to the sensor arrangement can also be applied to the method for fabricating a sensor arrangement. The same is true in the opposite direction, as long as such statements are technically suitable.

The method provides for a cheap and efficient fabrication of a sensor arrangement, especially a sensor arrangement according to the disclosure.

According to an implementation, the barometric pressure sensors are already mounted on the flexible circuit board when the method starts. However, in an alternative implementation, mounting the barometric pressure sensors on the flexible circuit board may be part of the method, for example as described further below.

Mounting the flexible circuit board on the rigid core can, for example, be performed by using a glue, using screws, or by clamping or otherwise fastening the flexible circuit board such that it covers at least a part of a surface of the rigid core.

With the barometric pressure sensors protruding away from the rigid core, application of forces to the barometric pressure sensors originating from forces applied on the measurement surface can be improved. Especially, this means that the rigid core contacts one surface of the flexible circuit board, and that the barometric pressure sensors are mounted on an opposite surface of the flexible circuit board.

When the compliant layer covers the barometric pressure sensors, it typically also covers the flexible circuit board, especially parts of the flexible circuit board that are outside the barometric pressure sensors, and at least a part of the rigid core. Especially the compliant layer may directly contact the rigid core at surface areas that are covered by the compliant layer but are not covered by the flexible circuit board. Covering with the compliant layer may especially be done as described further below.

Preferably, covering the barometric pressure sensors with a compliant layer comprises the following steps:

placing the rigid core with the flexible circuit board in a mould, at least partially filling the mould with a material such that the barometric pressure sensors are covered by the material, converting the material into the compliant layer.

Such a method for covering with a compliant layer provides for an easy and cost-efficient fabrication. The mould may especially define the final shape of the measurement surface, especially such that the measurement surface of the compliant layer gets a shape defined by the shape of the mould.

The mould may be partially filled with a material, or it may also be completely filled. This depends on which part of the rigid core or the flexible circuit board mounted on the rigid core should be covered by the compliant layer. Especially, the mould may be filled with the material at least to such an amount that the flexible circuit board is covered completely by the material.

Converting the material into the compliant layer means that a material can be used which is easier to handle, for example because it is a fluid that can be easily filled into the mould.

Converting may, for example, comprise the following step:

degassing the material by placing the rigid core with the flexible circuit board covered by the material in vacuum.

Thus, a material can be used that is, for example, fluid in its non-degassed state, but is a compliant layer in its degassed state.

Degassing can especially be done or start at room temperature, for example in a temperature range between 15° C. and 25° C. During vacuum state the temperature may increase compared to such values.

It should, however, be noted that also other techniques for forming a compliant layer can be used.

Providing the flexible circuit board may comprise one or both of the following steps:

cutting at least a portion of the flexible circuit board out of a sheet, arranging and mounting the barometric pressure sensors on the flexible circuit board.

Thus, the preparation of the flexible circuit board with its barometric pressure sensors may be made a part of the method. In an alternative embodiment, a flexible circuit board with barometric pressure sensors already being mounted thereon may be used.

According to an embodiment, the rigid core is dome shaped. This can especially be suitable when the sensor arrangement is a tip of a robot or another manipulation element. However, also other shapes can be used. For example, the sensor arrangement can be adapted to design foot sensors, shin sensors, thigh sensors, or breast sensors for a robot. The shape of the rigid core can be adapted accordingly. For example, it can have the shape of a flat plane, a cylinder, or can be random shaped. Typically, the shape is designed such that the contact force can activate multiple barometric pressure sensors at the same time, by which the force can be localized.

The rigid core may especially have a plurality of facets. According to an implementation, each barometric pressure sensor or at least a part of the barometric pressure sensors is positioned on at least one of the plurality of facets. Thus, the orientation of each barometric pressure sensor may be defined by the orientation of the respective facet on which it is positioned. This does not preclude that more than one barometric pressure sensor may be arranged on a respective facet. It is also possible that there are facets or other parts of a surface of the rigid core on which no barometric pressure sensor is mounted.

It should be noted that while the barometric pressure sensors are placed on the flexible circuit board, the flexible circuit board typically adapts to the shape of the facets of the rigid core. Thus, the flexible circuit board forms facets itself.

Especially, the facets can have different orientations, so that measurement of forces in different orientations can be performed.

The compliant layer may comprise or consist of a plastic material or rubber. The plastic material may be a thermoplastic, an elastomer, a thermoplastic elastomer, or a thermoset or a similar material. Such materials have been proven suitable for typical applications; however, also other materials can be used. Especially, they can be used in the fabrication process of the compliant layer described above.

The compliant layer may especially relay forces applied on the measurement surface to at least a part of the barometric pressure sensors. Especially, it may be configured such that it relays forces to more than one barometric pressure sensor, at least for a part or the majority of the measurement surface. This allows for enhancement of resolution when measuring forces using electronic force inference techniques.

The barometric pressure sensors may especially be connected by conductor paths on the flexible circuit board. These conductor paths may especially be flexible, so that they adapt to a surface of the rigid core automatically when the flexible circuit board is wrapped around. Such conductor paths allow for a reliable and easy connection of the barometric pressure sensors.

The flexible circuit board may especially be asterisk-shaped. Especially, it may comprise a plurality of arms or spokes being connected at a central portion. This allows especially for wrapping around the flexible circuit board on a dome-shaped rigid core, as can, for example, be seen from the enclosed drawings.

The barometric pressure sensors may be arranged with a distance of at least 1 mm, at least 2 mm, at least 3 mm, at least 4 mm, or at least 5 mm. They may also be arranged with a distance of at most 1 mm, at most 2 mm, at most 3 mm, at most 4 mm, or at most 5 mm. The distance may be measured between outer surroundings of the barometric pressure sensors. Each two different values can be combined in order to form suitable intervals.

Especially, the sensor arrangement may be a robotic tip and/or a manipulation element of a robot. While this is a preferable application, it should be noted that the sensor arrangement can in principle be used also for a plurality of other applications, especially when a force has to be measured and/or when an element should be used for manipulation. Manipulation especially means that the manipulation element, which can for example be identical to the sensor arrangement, can grasp or catch an item to be manipulated and manipulate this item, for example with respect to its position or orientation. While doing this, forces can be measured using the sensor arrangement.

In general, it can be said that the sensor arrangement as disclosed herein may combine barometric sensing technology with novel assembly methods. It may further be combined with machine learning techniques, for example as disclosed herein, in order to create a high-resolution tactile sensor with a high level of robustness and, for example, with a three-dimensional dome shape.

Especially, the rigid core may be 3D printed. This can mean that providing the rigid core comprises the step of 3D printing the rigid core. However, also other manufacturing methods like drilling or moulding can be used.

For example, at least 5, at least 10, at least 15, at least 19, at least 20, at least 25, at least 30, at least 35, or at least 37 barometric pressure sensors can be used. They can be wrapped over a dome-shaped central core. Such an assembly may be placed in a mould where it is covered in material, for example urethane, to provide a flexible outer surface that protects the sensors, while also enabling localized pressure measurements.

Machine learning techniques may be used to make use of sensor data to provide super-resolution sensing of tactile interactions. As such, the barometric pressure sensors may act as if there are in fact more sensors. Machine learning algorithms may be integrated by first learning an intrinsic model for the finger pad combining a finite element method and then correlating real physical barometers with the intrinsic model using transfer learning. A force distribution map (nodal forces with a 3 DOF and local coordinate system) may be predicted as representation of the touch impact which could be classified into different manipulation scenarios, for example holding, flip detection, torsion, etc.

The approach allows high resolution sensing all around the finger profile making the system perfect for a variety of applications, where the location of object contact cannot be predicted or could vary significantly. Additionally, the hardware elements used for the sensor arrangement are quite cheap, especially compared with other sensors that are known in the prior art.

According to a preferred embodiment, the sensor arrangement according to the disclosure or manufactured according to a method according to the disclosure further comprises an electronic control module configured to perform a method for force inference of the sensor arrangement. This can integrate functionality for force inference in the sensor arrangement. The electronic control module can, for example, be positioned in or at the rigid core or can be positioned separate to the rigid core.

Especially, the control module can be configured to perform the method for force inference to provide a force map of the measurement surface, the force map comprising a plurality of force vectors. Such a force map can give relevant information about applied forces, that can e.g. originate from an indenter pressing on the measurement surface or from an object that is to be manipulated.

The control module can especially be configured to perform a method for force inference and/or training methods as described further below.

According to typical implementations, the force map may comprise at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2.

According to typical implementations, the force map may comprise at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2.

Such values have been proven suitable for typical use cases. However, also other values can be used.

According to typical implementations, the force map may comprise at least 500, at least 1000, or at least 2000 force vectors. According to typical implementations, the force map may comprise at most 1000, at most 2000, at most 3000, or at most 4000 force vectors. Such values have especially been proven suitable for the use case of the sensor arrangement being a robot tip. However, also other values can be used.

Preferably, each force vector comprises a normal force component, a first shear force component and a second shear force component. This allows information not only about normal forces, but also about shear forces and thus allows, for example, better regulation of a robot tip application.

Especially, the first shear force component may correspond to a first shear force and the second shear force component may correspond to a second shear force. The first shear force may especially be perpendicular to the second shear force. Especially, the shear force components may be perpendicular to each other.

According to an implementation, the control module may be configured for reading out temperature values from the barometric pressure sensors and providing temperature information or a temperature map of the sensor arrangement based on the temperature values. This may give additional information about temperature distribution, which can e.g. be used in control or surveillance applications. Especially, the barometric pressure sensors may have a respective integrated temperature measuring function that can be used for this purpose.

In the following, further inventive aspects are described. Such aspects may be combined, alone or in combination, with other features disclosed herein. They can also be regarded as separate inventive aspects and can be made the subject of claims.

BRIEF DESCRIPTION OF THE FIGURES

Further aspects and advantages will be apparent to a person skilled in the art from the following description of the enclosed drawings. These show:

FIG. 6: a mould in an assembled state.

DETAILED DESCRIPTION

Figure 1:
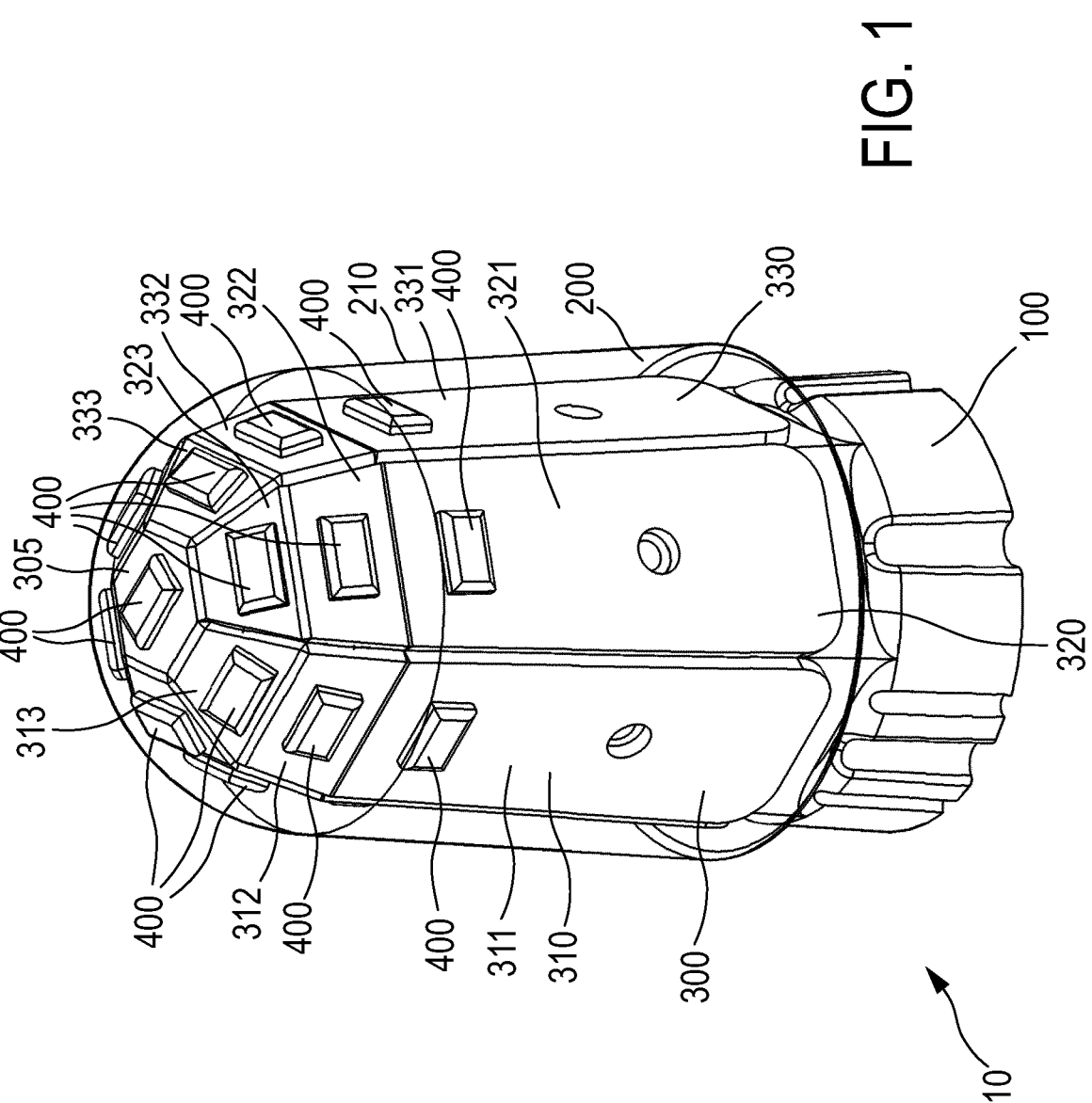
FIG. 1: a sensor arrangement.

FIG. 1 shows a sensor arrangement 10 according to an embodiment of the present disclosure.

The sensor arrangement 10 comprises a rigid core 100 which is dome-shaped. The rigid core 100 is partially covered by a flexible circuit board 300, which is fixedly mounted on the rigid core 100. The flexible circuit board 300 is covered by a compliant layer 200.

A plurality of barometric pressure sensors 400 are applied on the flexible circuit board 300. They protrude away from the rigid core 100. The compliant layer 200 provides a measurement surface 210 on which a force can be applied. The compliant layer 200 is flexible and resilient, so that a force applied on the measurement surface 210 leads to a local deformation of the measurement surface 210, wherein the compliant layer 200 relays these forces to at least a part of the barometric pressure sensors 400. Thus, the barometric pressure sensors 400 can be used in order to evaluate the force or applied forces.

The flexible circuit board 300 comprises a plurality of facets. These facets correspond to facets that are structured on the rigid core 100, as shown in detail in FIG. 2.

The flexible circuit board 300 has a central portion 305, from which, in the current embodiment, six arms extend. This central portion 305 may be regarded as a facet. The arms are all shown in FIG. 3. In FIG. 1, only three of these arms, namely a first arm 310, a second arm 320, and a third arm 330 are visible and denoted by reference signs.

Each arm is divided into three facets, for example the first arm 310 is divided into a first facet 311, a second facet 312, and a third facet 313. The other arms are divided accordingly, wherein facets 321, 322, 323, 331, 332 and 333 of the flexible circuit board 300 are visible in FIG. 1.

In the current embodiment, each facet holds one barometric pressure sensor 400. Also, the central portion 305 holds one barometric pressure sensor 400. It should be noted that also other configurations are possible, for example a facet can comprise more than one or no barometric pressure sensor 400.

It should be noted that the barometric pressure sensors 400 are spaced apart from each other on the flexible circuit board 300. However, a much finer resolution with regard to applied forces can be achieved using techniques described below.

Figure 2:
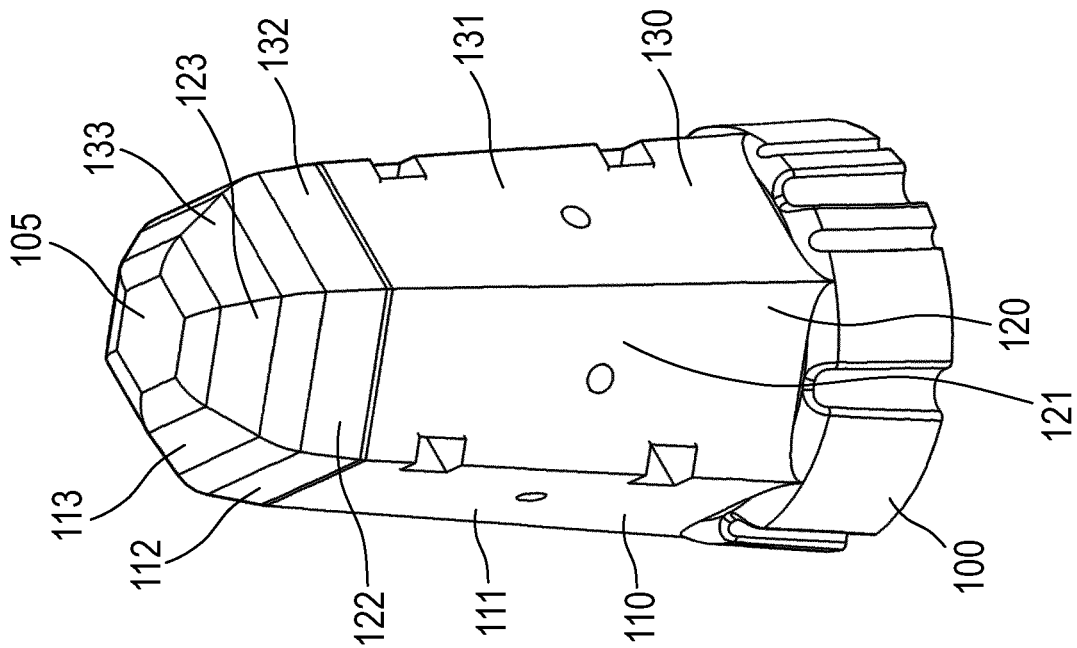
FIG. 2: a rigid core.

FIG. 2 shows the rigid core 100 separately. The rigid core 100 comprises altogether six surface areas, of which a first surface area 110, a second surface area 120, and a third surface area 130 are visible and denoted in FIG. 2. Each surface area 110, 120, 130 is divided into three facets, wherein, for example, the first surface area 110 is divided into a first facet 111, a second facet 112, and a third facet 113. The other surface areas are divided accordingly, wherein facets 121, 122, 123, 131, 132 and 133 are visible in FIG. 2. At the top of the rigid core 100, a central portion 105 connects the surface areas.

The facets of the rigid core 100 define the facets of the flexible circuit board 300. In detail, the facets have different orientations, and the flexible circuit board 300 adapts to the respective orientations of the facets.

In FIG. 2, it is also clearly shown that the rigid core 100 is dome-shaped, which can, for example, be used for a fingertip of a robot.

Figure 3:
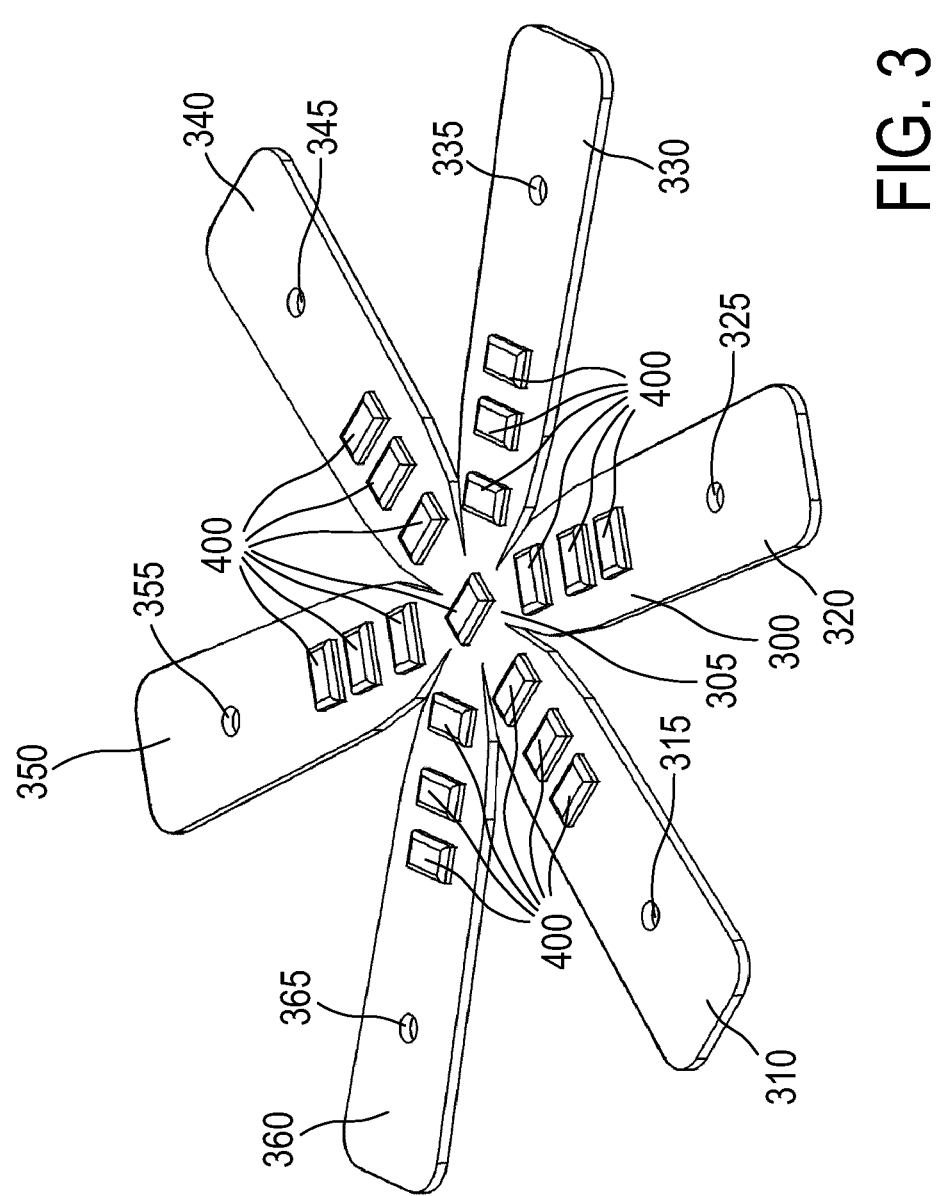
FIG. 3: a flexible circuit board.

FIG. 3 separately shows the flexible circuit board 300 with the barometric pressure sensors 400 mounted on it. As already mentioned, the flexible circuit board 300 has six arms 310, 320, 330, 340, 350, 360 which connect together at the central portion 305. There are altogether nineteen barometric pressure sensors 400 mounted on the flexible circuit board 300 in the current embodiment. More or less barometric pressure sensors can be used in other embodiments.

It should be noted that there are no facets shown in FIG. 3, because these facets are not an intrinsic feature of the flexible circuit board 300. The facets of the flexible circuit board 300 shown in FIG. 1 are rather a result of the flexible circuit board 300 being mounted on the rigid core 100 shown in FIG. 2.

It should be noted that in each arm 310, 320, 330, 340, 350, 360 a respective hole 315, 325, 335, 345, 355, 365 is provided, which can, for example, be used in order to fasten the flexible circuit board 300 to the rigid core 100, for example during manufacturing.

Figure 4:
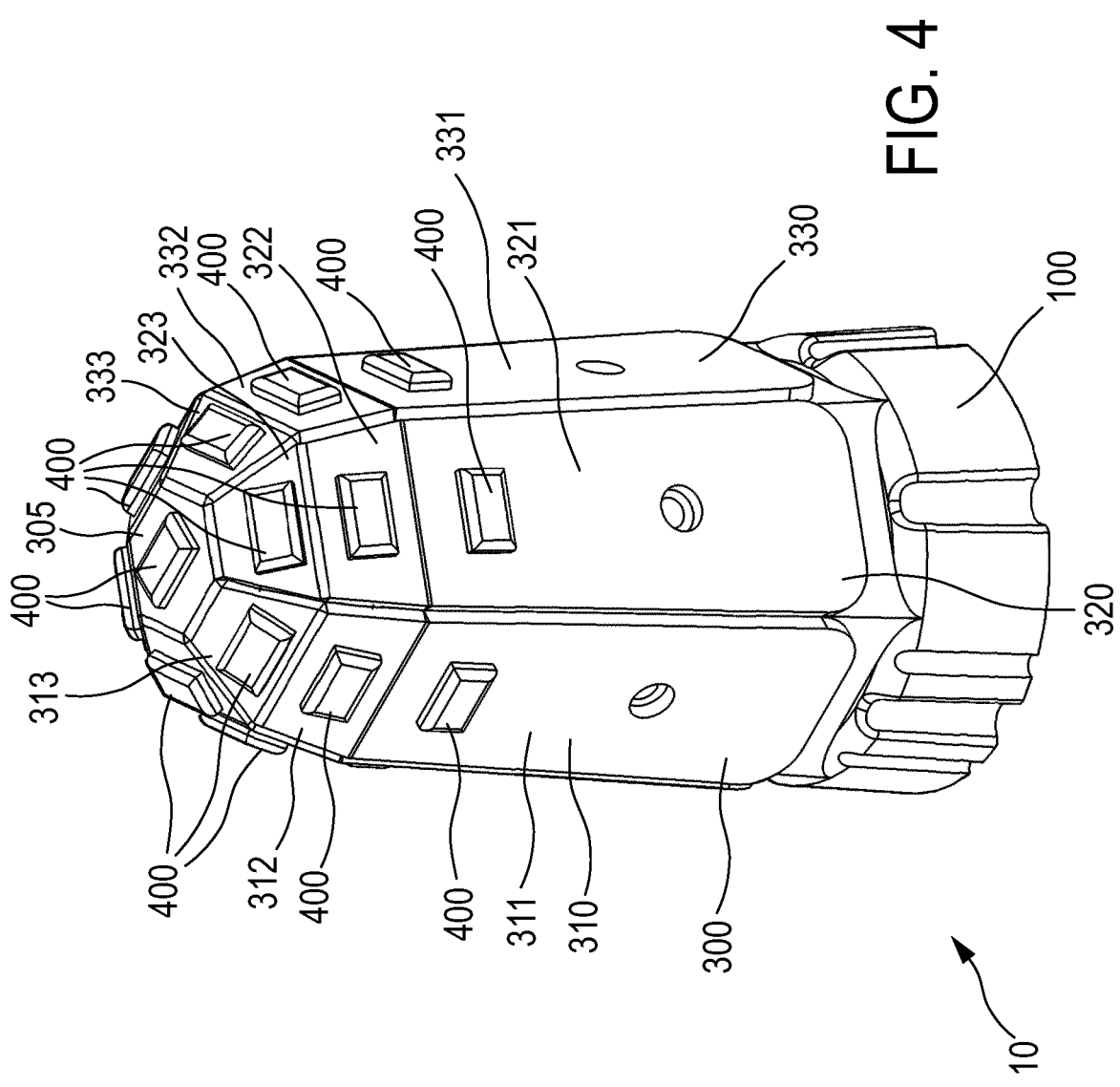
FIG. 4: a rigid core with a flexible circuit board.

FIG. 4 shows the flexible circuit board 300 of FIG. 3 being mounted on the rigid core 100 of FIG. 2. Thus, the facets of the flexible circuit board 300 are already formed due to the flexible circuit board 300 acquiring the structure of the rigid core 100. The arrangement shown in FIG. 4 does not yet have the compliant layer 200 shown in FIG. 1. It will be shown with reference to the next figures how the compliant layer 200 and its measurement surface 210 are formed.

Figure 5:
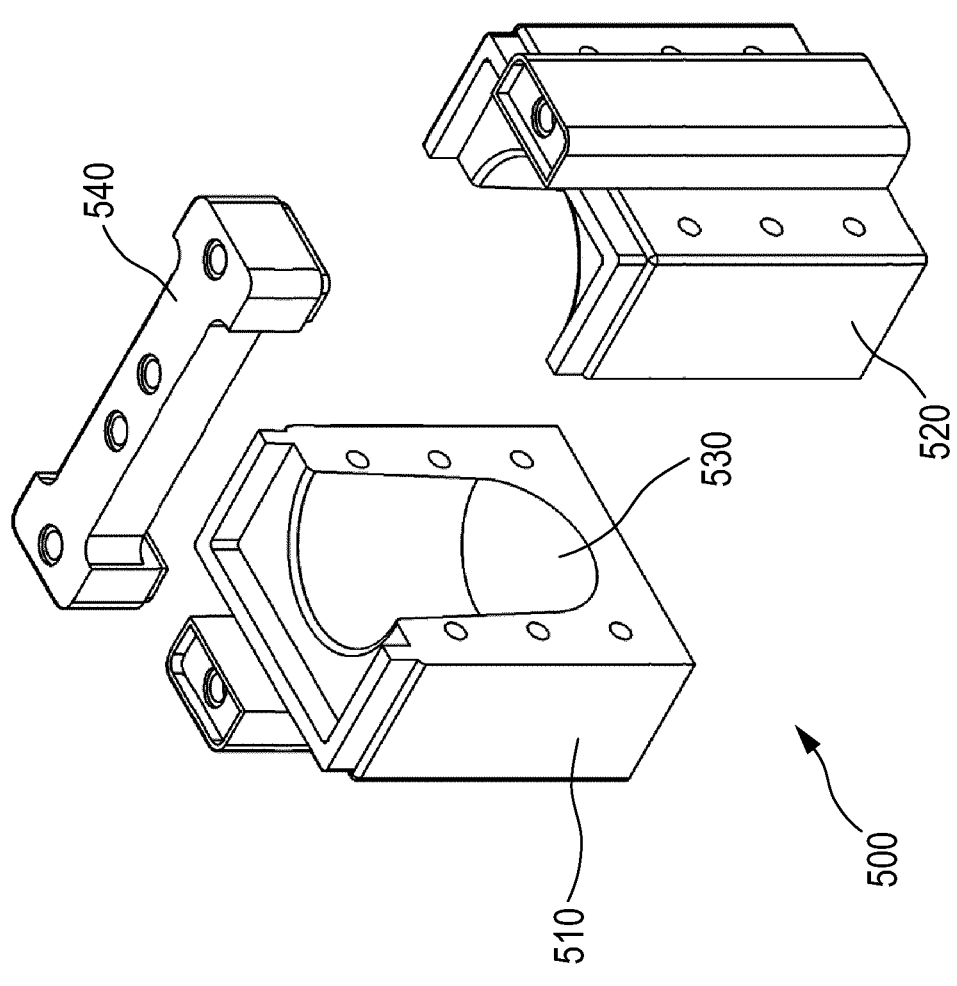
FIG. 5: a mould in an explosion view.

FIG. 5 shows a mould 500 in an explosion view. The mould 500 comprises a first part 510 and a second part 520. As shown in FIG. 5, a hollow interior 530 is formed inside the parts 510, 520 such that the hollow interior 530 is only open to the top of the mould 500 when the parts 510, 520 are assembled. In addition, the mould 500 comprises a top portion 540 in order to fasten the arrangement of a rigid core with a flexible circuit board mounted on it, as shown in FIG. 4.

Figure 6:
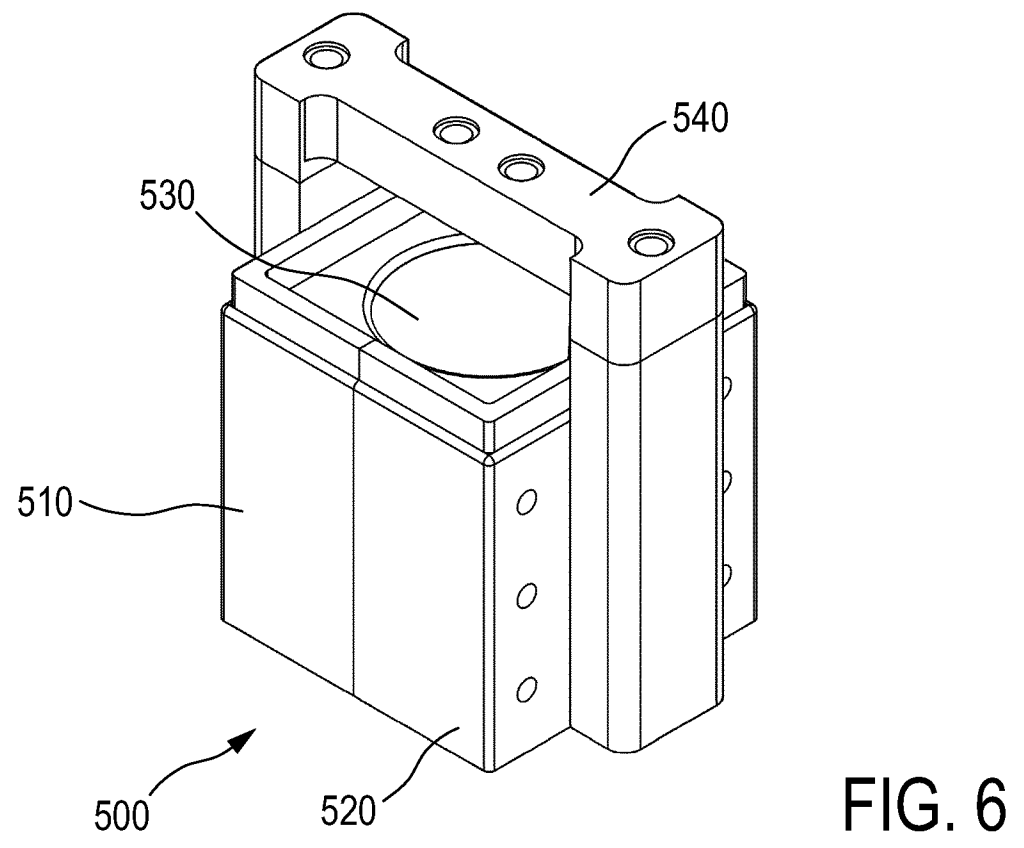

FIG. 6 shows the mould 500 in an assembled state. Thus, the hollow interior 530 is only open to the top of the mould 500, and the top portion 540 spans over the hollow interior 530.

Figure 7:
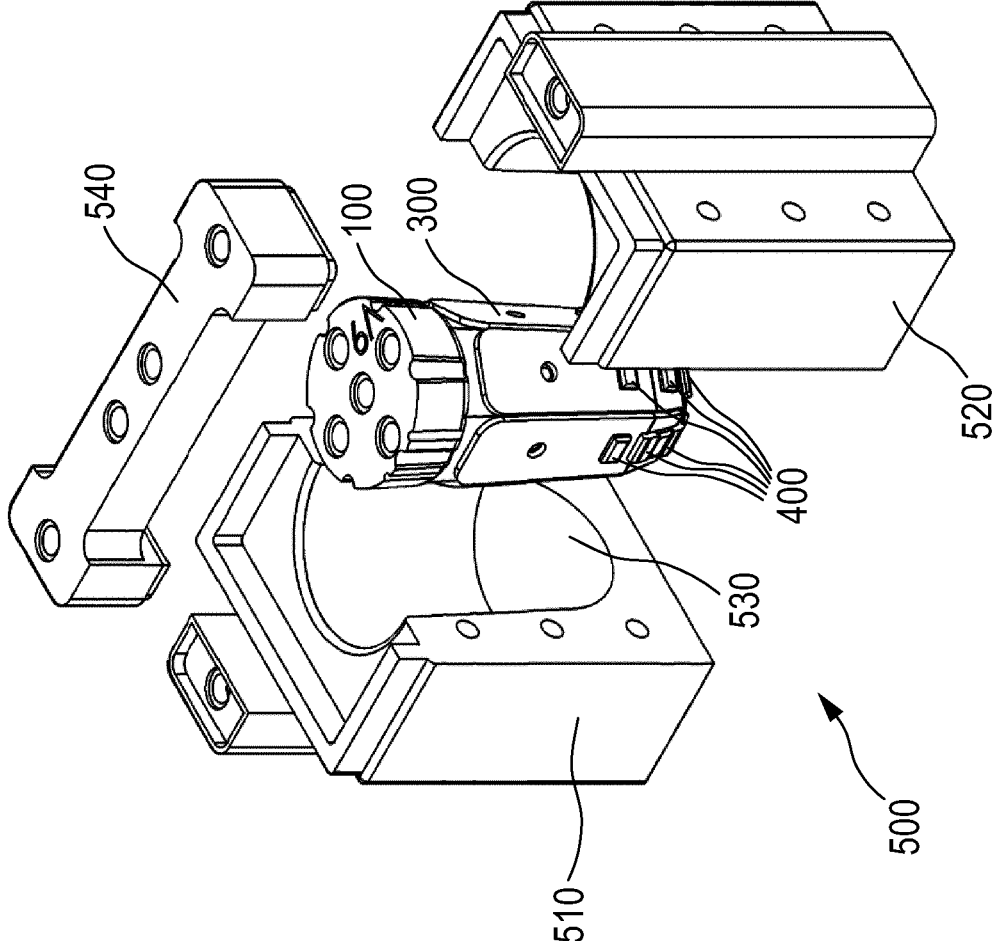
FIG. 7: a mould with a rigid core covered by a flexible circuit board in an explosion view.
Figure 8:
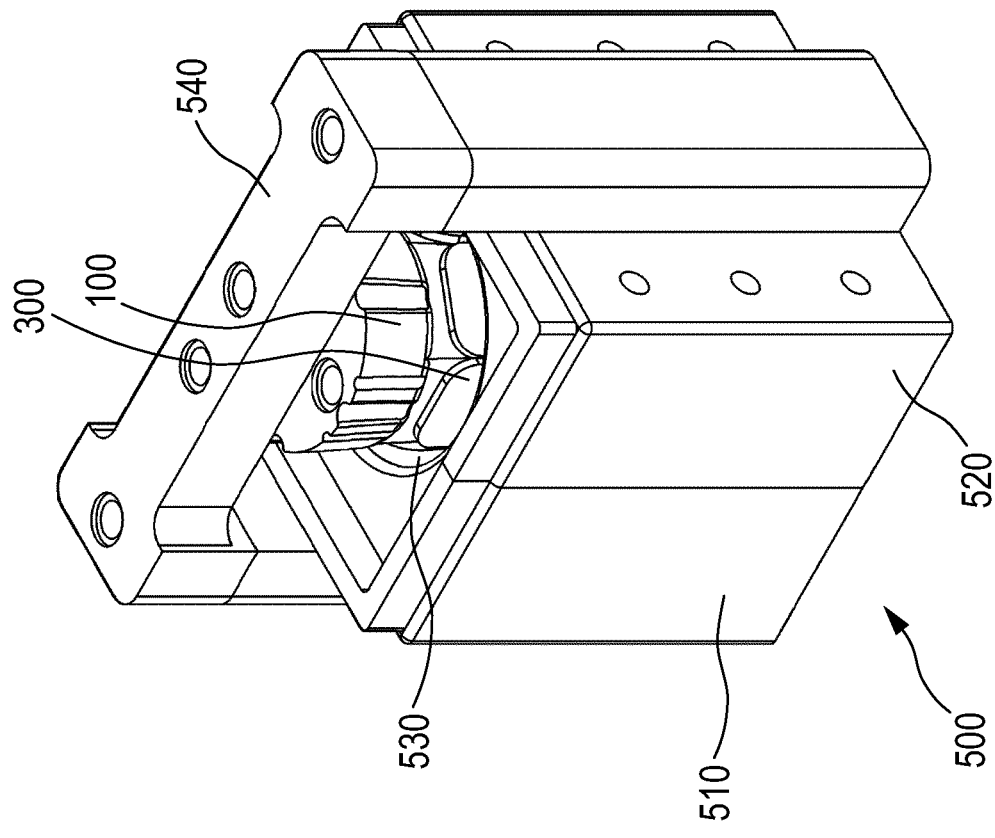
FIG. 8: a mould and a rigid core with a flexible circuit board in a state for covering barometric pressure sensors.

FIG. 7 shows the mould 500 as already explained with the arrangement of rigid core 100 with the flexible circuit board 300 and its barometric pressure sensors 400 mounted on it. FIG. 7 shows an explosion view, whereas FIG. 8 shows the same in an assembled state. In the state shown in FIG. 8, the rigid core 100 is mounted to the top portion 540 of the mould, and the rigid core 100 projects downwards from the top portion 540 into the hollow interior 530.

In the state shown in FIG. 8, a material, for example a plastic material, can be filled into the hollow interior 530 in a fluid form. This is easy to handle due to the fluid properties. The material can be filled in the hollow interior 530 so that the flexible circuit board 300 and the rigid core 100 are covered by the material up to a level corresponding to a position to which the compliant layer 200 should cover the flexible circuit board 300 and the rigid core 100. The surface of the hollow interior 530 defines the measurement surface 210 in the final state.

After filling in the material, the arrangement of mould 500 with the rigid core 100, the flexible circuit board 300 mounted on it and the already filled in material are put into a vacuum chamber. The vacuum chamber will be evacuated, and the material will be degassed. By degassing, the material transforms into the compliant layer 200, so that the sensor arrangement 10 shown in FIG. 1 has been manufactured.

The process shown with regard to these figures is a manufacturing process for a sensor arrangement 10 that requires only a few specific components and is easy to perform. Thus, costs can be reduced significantly compared to much more expensive embodiments known in the prior art.

Figure 9:
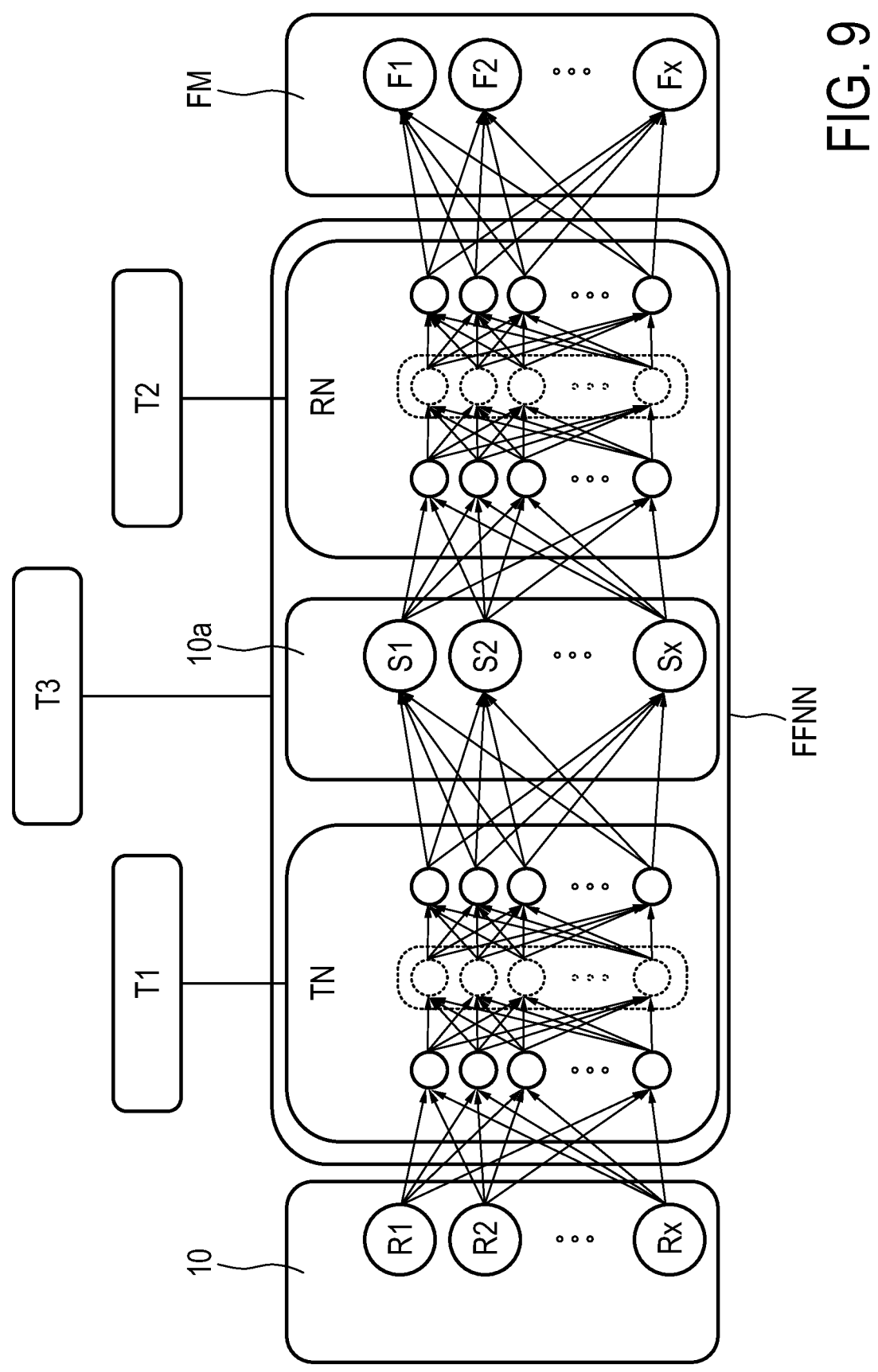
FIG. 9: a schematic diagram for force inference.

FIG. 9 shows a schematic diagram of a method for force inference of a sensor arrangement 10, for example a sensor arrangement 10 as described before. As already mentioned, the sensor arrangement 10 comprises a plurality of barometric pressure sensors 400. Such barometric pressure sensors 400 produce respective pressure values R1, R2, . . . , Rx as respective output values, indicating a pressure sensed by the respective barometric pressure sensor 400 at its position below the compliant layer 200.

Such pressure values R form the input of a transfer network TN, which is a neural network mapping the barometric pressure sensors 400 to a plurality of virtual sensors of a finite element model 10a of the sensor arrangement 10. The virtual sensors will be described further below with respect to FIG. 10. Each of the virtual sensors comprises one or more virtual sensor points, each having a virtual sensor point value S1, S2, . . . , Sx. Also, this will be described in detail further below with respect to FIG. 10.

The fact that the transfer network TN maps the pressure values R to the virtual sensor point values S means that the transfer network TN delivers a set of virtual sensor point values S as output for each combination of pressure values R which it gets as input. This requires training of the transfer network TN, which can especially be done as described herein.

The virtual sensor point values S1, S2, . . . , Sx form the input of a reconstruction network RN, which is a neural network mapping the virtual sensors of the finite element model 10a to a force map FM. The force map FM comprises a plurality of force vectors F1, F2, . . . , Fx, wherein the force vectors F of the force map FM each have three components, namely a normal force component and two perpendicular shear force components. Thus, each force vector F gives the value of an applied force at a specific point on the measurement surface 210 and its direction. The force map FM is further explained with reference to FIG. 16.

The fact that the reconstruction network RN maps the virtual sensor point values S to the force map FM means that the reconstruction network RN delivers a set of force vectors F as output for each combination of virtual sensor point values S which it gets as input. This requires training of the reconstruction network RN, which can especially be done as described herein.

The transfer network TN and the reconstruction network RN form together a feed-forward neural network FFNN, which is to be regarded as a neural network for mapping the barometric pressure sensors 400 to the force map FM, and which is split in two parts, as shown and already explained.

For training the transfer network TN, a method T1 can be used. For training the reconstruction network RN, a method T2 can be used. For training the entire feed-forward neural network FFNN, a method T3 can be used. Such methods are described further below.

The use of neural networks, or artificial intelligence as a generalization, allows to extract much more information from the barometric pressure sensors than a direct force inference without artificial intelligence would yield. Especially, applied forces can be evaluated with much greater resolution than the spacing of the barometric pressure sensors 400. Furthermore, additional information like shear forces and/or how many indenters have been applied and their position can be extracted. Such information is included in a force map FM that is calculated based on the pressure values R.

Figure 10:
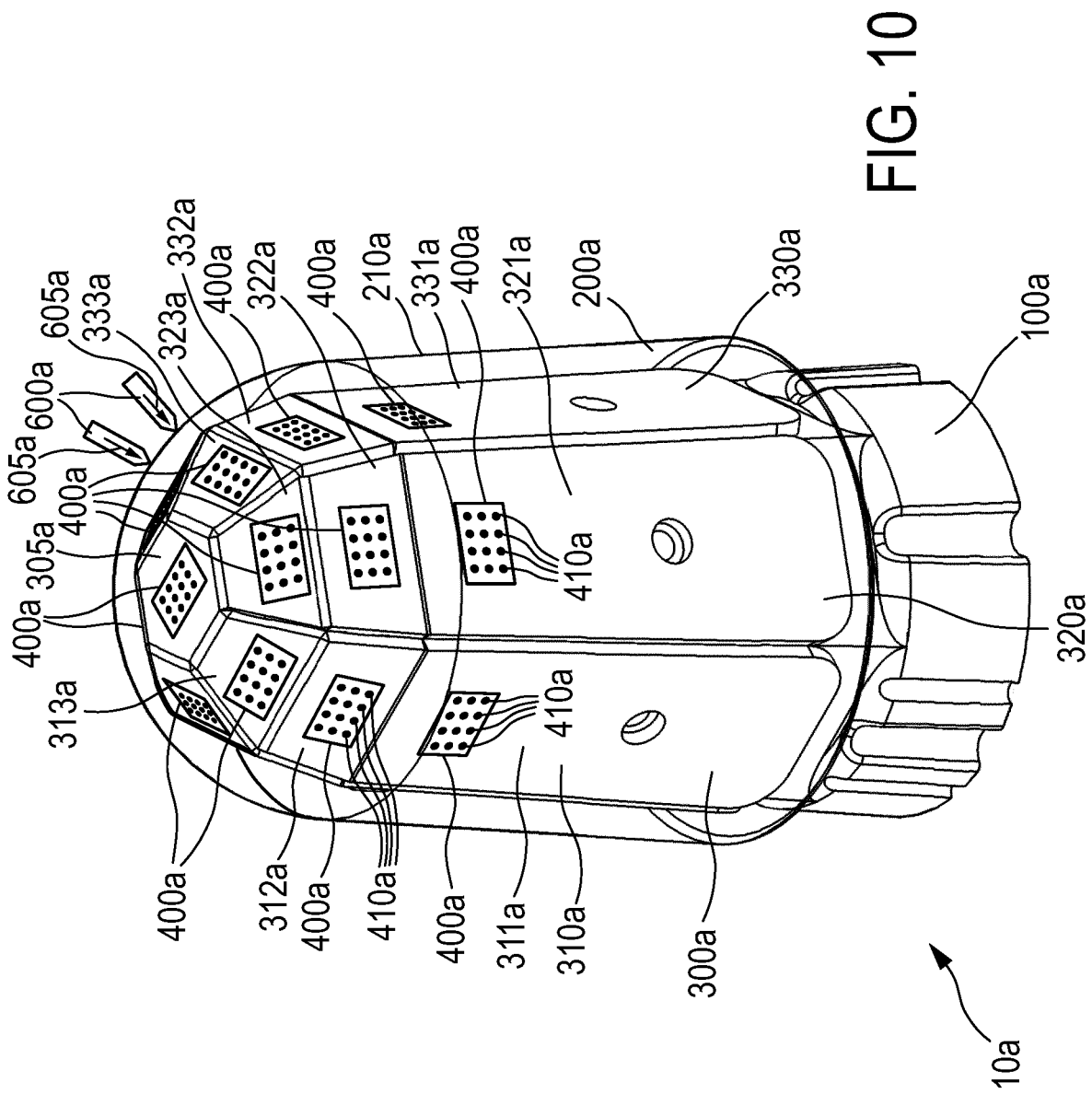
FIG. 10: a finite element model.

FIG. 10 shows a finite element model 10a of the sensor arrangement 10. This finite element model 10a is used in the process for force inference described with respect to FIG. 9. It should be noted that in FIG. 10 structural details are shown with respect to the sensor arrangement 10, but no specific details of implementation of a finite element calculation, as such finite element concepts rely on known technology. In principle, the finite element model 10a is an electronic representation of the real sensor arrangement 10, so that the behaviour of the sensor arrangement 10 can be simulated with the finite element model 10a.

All components of the sensor arrangement 10 have corresponding components in the finite element model 10a, wherein the components in the finite element model 10a are denoted by the letter "a". The structural difference between the sensor arrangement 10 and the finite element model 10a is the fact that the barometric pressure sensors 400 of the sensor arrangement 10 are replaced by virtual sensors 400a of the finite element model 10a. Each virtual sensor 400a comprises one or more sensor points 410a, wherein an implementation is shown in which each virtual sensor 400a comprises twelve virtual sensor points 410a. Each virtual sensor point 410a has a respective virtual sensor point value S, as already discussed with respect to FIG. 9. However, also other numbers of virtual sensor points 410a for each virtual sensor 400a can be used.

Thus, a simulated force 605a applied on a simulated measurement surface 210a of the finite element model 10a is relayed to the virtual sensors 400a and its virtual sensor points 410a by the finite element representation of the compliant layer 200, i.e. a simulated compliant layer 200a. Such a relayed force gives rise to respective virtual sensor point values S. This can be used in order to perform simulations giving respective virtual sensor point values S for each applied simulated force 605a or combination of simulated forces 605a.

Such simulated forces 605a can be applied by simulated indenters 600a, wherein two of such simulated indenters 600a are shown as an example in FIG. 10. With these simulated indenters 600a, simulated forces can be applied on the simulated measurement surface 210a, and the virtual sensor point values S can be calculated by standard finite element model methods.

Data which is acquired from such simulations can be used in order to train the reconstruction network RN, wherein typically a plurality of such simulations is used for training, for example 1,000 simulations or some 10,000 simulations, and these simulations are typically done with different types of simulated indenters 600a, especially having different shapes and/or sizes, and with different numbers of simulated indenters 600a, for example with one indenter 600a, two indenters 600a and/or three indenters 600a. Such simulations can be performed by pure computer simulation and do not need any experimental setup which is complicated to handle. This allows for a very efficient and reliable training of the reconstruction network RN, which thus gets much more capabilities to reconstruct a force map FM even if experimental capabilities are limited.

Figure 11:
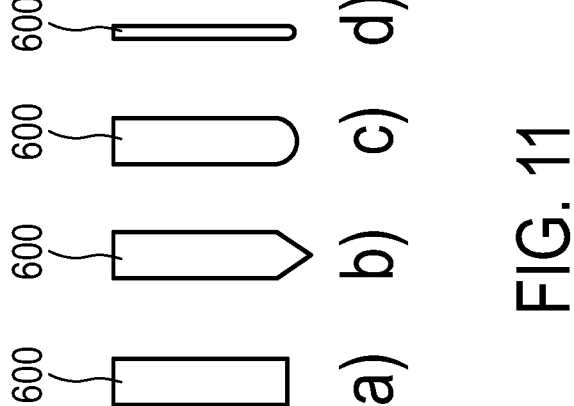
FIG. 11: several different indenters.

FIG. 11 schematically shows shapes of four different indenters 600, which can be physical indenters 600 for usage in an experimental setup as described further below with respect to FIG. 12, or which can be simulated indenters 600a.

FIG. 11a shows an indenter 600 having a flat shape at its contact portion to the measurement surface 210. FIG. 11b shows an indenter 600 having a tip shaped contact portion. FIG. 11c shows an indenter 600 having a contact portion shaped like a hemisphere. FIG. 11d shows an indenter 600 having the same type of contact portion as the indenter 600 shown in FIG. 11c but having a smaller size. Using such different indenters 600 can optimize training of the neural networks with respect to such different shapes, meaning that the capabilities of the neural networks trained with such different indenters 600 are increased with respect to reconstructing forces applied by indenters 600 with different indenter shapes. Stated differently as an example, a force map FM reconstructed after application of an indenter 600 with a flat shape will be different from a force map FM reconstructed after application of an indenter 600 having a hemispherical shape.

Figure 12:
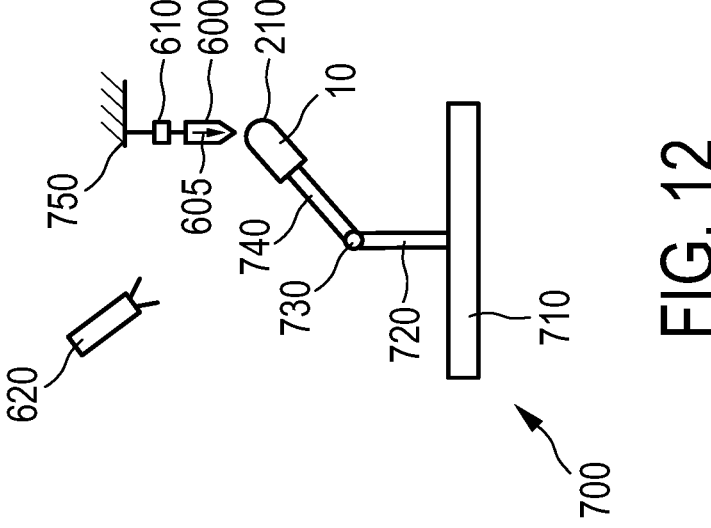
FIG. 12: an arrangement for doing force tests.

FIG. 12 shows an experimental setup 700 for doing force tests. The experimental setup 700 comprises a bottom portion 710, on which a first machine arm 720 is mounted. On the first machine arm 720, an articulation 730 is positioned. A second machine arm 740 is fastened to the articulation 730. The articulation 730 can be used in order to actively move the second machine arm 740, wherein electric drives are used for such movement, which are not shown.

At the other end of the second machine arm 740, a sensor arrangement 10 as described before is positioned. This is only shown schematically here, wherein the outer surface of the sensor arrangement 10 is the measurement surface 210 as already described.

The experimental setup 700 further comprises a top portion 750, at which a force sensor 610 is mounted. At the force sensor 610 an indenter 600 is mounted. The articulation 730 can now be used in order to press the sensor arrangement 10 against the indenter 600, wherein during such a force test pressure values R are read out from the barometric pressure sensors 400, and a force 605 applied by the indenter 600 to the measurement surface 210 is measured with the force sensor 610. The force sensor 610 measures a three-dimensional force, so that both normal force components and shear force components are measured. The three-dimensional force may be represented in a global coordinate system, or it may be represented with a normal component being perpendicular to a point on the measurement surface 210 and two shear force components that are typically perpendicular to the normal component and are typically perpendicular to each other. A coordinate transformation can be used to calculate components in a coordinate system if they are known in another coordinate system.

A position at which the indenter 600 contacts the measurement surface 210 is observed by a camera 620. This allows for calculation of coordinates of this position on the measurement surface 210 by image recognition. As an alternative, such position can, for example, be calculated using machine parameters.

The fact that the indenter 600 is stationary and the sensor arrangement 10 is moved in the experimental setup 700 allows for usage of articulation setups known e.g. from 3D printers. However, it should be noted that force tests can alternatively be performed differently, for example by moving the indenter 600 with a stationary sensor arrangement 10, or by moving both the sensor arrangement 10 and the indenter 600.

Data originating from such force tests can be used in order to train neural networks shown in FIG. 9, as will be described further below.

Figure 13:
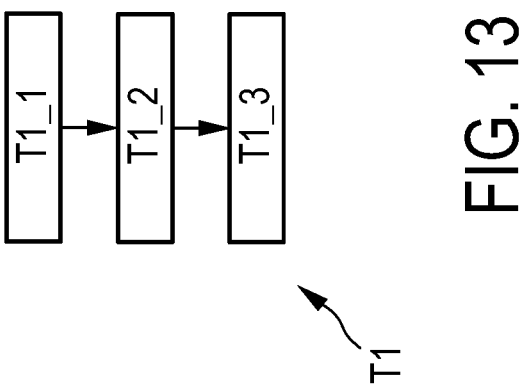
FIG. 13: a flow diagram of a process for training a transfer network.

FIG. 13 shows a schematic diagram of a method T1 for training a transfer network TN.

In a first step T1_1, a plurality of force tests are performed as described with respect to FIG. 12. For such force tests, preferably different indenters 600 having different shapes and/or sizes are used, wherein only one indenter 600 is used in each force test in the described implementation.

In step T1_2, a plurality of simulations with the finite element model 10a are performed, wherein one simulation is performed for each force test, wherein a force 605 measured by the force sensor 610 in the force test is used in the corresponding simulation for application of a simulated force 605*a*. The position on the simulated measurement surface 210*a* is identical with the position on the measurement surface 210 in the force test, wherein such a position can, for example, be calculated from machine parameters or can be derived from image recognition as already described with reference to FIG. 12. The shape of a simulated indenter 600*a* is identical to the shape of the real indenter 600. In each force test virtual sensor point values S are calculated by standard finite element simulation based on the applied simulated force 605*a*.

In step T1_3, the transfer network TN is trained with the data acquired by the force tests and the simulations, wherein especially the pressure values R of the barometric pressure sensors 400 originating from the force tests and the calculated virtual sensor point values S originating from the corresponding simulations are used for training.

Figure 14:
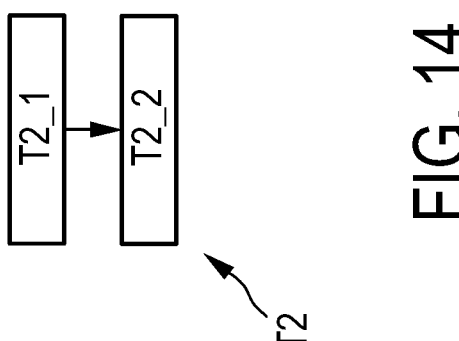
FIG. 14: a flow diagram of a process for training a reconstruction network.

FIG. 14 shows a method T2 for training the reconstruction network RN.

In a first step T2_1, a plurality of simulations with the finite element model 10*a* are performed, wherein preferably a plurality of different numbers of indenters are used, and wherein further preferably a plurality of different indenter shapes and indenter sizes are used. In each simulation, a simulated force map FMa is calculated on the simulated measurement surface 210*a*, and corresponding virtual sensor point values S are calculated.

With such simulated force maps FMa and virtual sensor point values S, the transfer network TN is trained in step T2_2, so that it can reconstruct a force map out of simulated sensor point values S.

Figure 15:
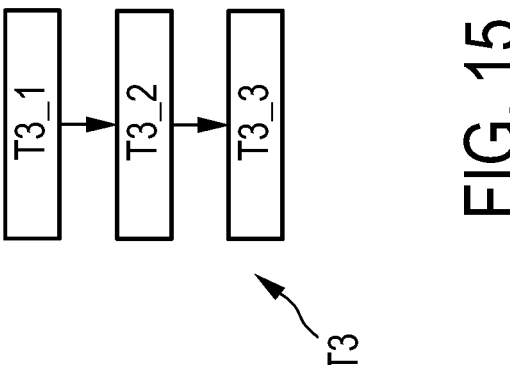
FIG. 15: a flow diagram of a process for training a feed-forward neural network.

FIG. 15 shows a method T3 for training the entire feed-forward neural network FFNN.

In a first step T3_1, a plurality of force tests is done, as explained with respect to FIG. 12. These force tests deliver applied forces 605, as measured by the force sensor 610, corresponding positions, and measured pressure values R of the barometric pressure sensors 400.

In a second step T3_2, a plurality of corresponding simulations are done with the finite element model 10*a* of the sensor arrangement 10, wherein each simulation comprises application of a simulated force 605*a* on the simulated measurement surface 210*a* of the finite element model 10 at the same position as in reality on the measurement surface 210 and with a simulated indenter 600*a* having the same indenter shape as the real indenter 600. Thereby, a simulated force map FMa is calculated on the simulated measurement surface 210*a*.

In a further step T3_3, the measured pressure values R of the force tests and the corresponding simulated force maps FMa originating from simulation are used in order to train the entire feed-forward neural network (FFNN), wherein in the shown implementation both the transfer network TN and the reconstruction network RN are trained.

It should be noted, that the process described with respect to FIG. 15 could also be used in case only one neural network is used, i.e. the splitting in a transfer network TN and a reconstruction network RN is not implemented. In the case of the implementation shown in FIG. 9, both the transfer network TN and the reconstruction network RN can be optimized by performing the method described with respect to FIG. 15 in addition to the methods described with respect to FIGS. 13 and 14.

Figure 16:
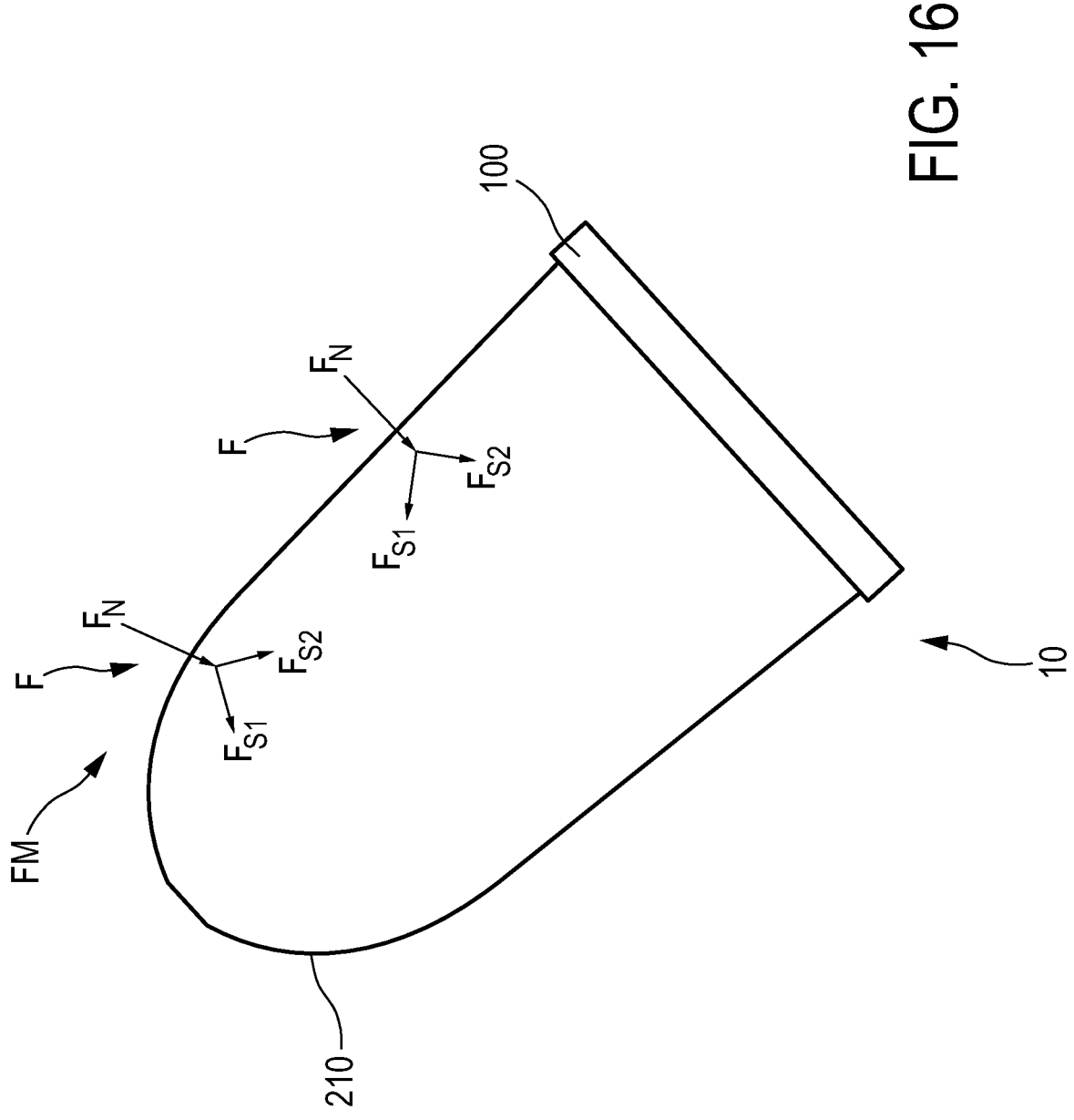
FIG. 16: an illustration of a force map.

FIG. 16 shows the sensor arrangement 10 with a schematic illustration of a force map FM. The force map FM comprises a plurality of force vectors F, which are positioned all around the measurement surface 210. While two force vectors F are shown in FIG. 16, much more force vectors F can be used in typical implementations. For example, 1 force vector F per mm2 can be used in an exemplary implementation.

Each force vector F has a normal force component FN, a first shear force component FS1 and a second shear force component FS2. The normal force component FN gives the value of a normal force component of an applied force, i.e. the component perpendicular to a local orientation of the measurement surface 210. The shear force components FS1, FS2 give the values of shear forces applied on the measurement surface 210 at the respective point. Shear forces are typically parallel to the local orientation of the measurement surface 210 and are typically perpendicular to each other and to the normal force. This may especially relate to a non-deformed orientation of the measurement surface which may define the orientation of the force vectors F, especially of its normal components.

Thus, each force vector F gives a strength and orientation of a force applied on a specific point on the measurement surface 210. Such a force can, for example, originate from an indenter 600.

It should be noted that also other definitions of a force vector F can be used, for example only a normal force component can be evaluated or the shear forces can have alternative definitions.

In case of a simulated force map FMa, the simulated force vectors Fa of such a simulated force map FMa on a simulated measurement surface 210*a* may have respective simulated components, for example a normal force component FNa, a first shear force component FS1*a* and a second shear force component FS2*a*. Such simulated force maps FMa are especially calculated in the simulations performed on the finite element model as described with respect to FIG. 10.

Mentioned steps of the inventive method can be performed in the given order. However, they can also be performed in another order, as long as this is technically reasonable. The inventive method can, in an embodiment, for example with a certain combination of steps, be performed in such a way that no further steps are performed. However, also other steps may be performed, including steps that are not mentioned.

It is to be noted that features may be described in combination in the claims and in the description, for example in order to provide for better understandability, despite the fact that these features may be used or implemented independent from each other. The person skilled in the art will note that such features can be combined with other features or feature combinations independent from each other.

References in dependent claims may indicate preferred combinations of the respective features, but do not exclude other feature combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 sensor arrangement
100 rigid core
105 central portion
110 first surface area
111 facet
112 facet
113 facet
120 second surface area
121 facet
122 facet
123 facet
130 third surface area
131 facet
132 facet
133 facet
200 compliant layer
210 measurement surface
300 flexible circuit board
305 central portion
310 first arm
311 facet
312 facet
313 facet
315 hole
320 second arm
321 facet
322 facet
323 facet
325 hole
330 third arm
331 facet
332 facet
333 facet
335 hole
340 fourth arm
345 hole
350 fifth arm
355 hole
360 sixth arm
365 hole
400 barometric pressure sensor
500 mould
510 first part

520 second part
530 hollow interior
540 top portion
600 indenter
605 force
610 force sensor
620 camera
700 experimental setup
710 bottom portion
720 first machine arm
730 articulation
740 second machine arm
750 top portion
10$a$ finite element model
210$a$ simulated measurement surface
400$a$ virtual sensor
410$a$ virtual sensor point
600$a$ simulated indenter
605$a$ simulated force
Other reference signs with letter a: component of the finite element model 10$a$
TN transfer network
RN reconstruction network
FFNN feed-forward neural network
T1 method for training a transfer network
T2 method for training a reconstruction network
T3 method for training a feed-forward neural network
R pressure value
S virtual sensor point value
FM force map
F force vector
FMa simulated force map
Fa simulated force vector
FN normal force component (of force vector)
FS1 first shear force component (of force vector)
FS2 second shear force component (of force vector)
FNa normal force component (of simulated force vector)
FS1$a$ first shear force component (of simulated force vector)
FS2$a$ second shear force component (of simulated force vector)

The invention claimed is:

1. A method for force inference of a sensor arrangement for sensing forces, the sensor arrangement comprising a plurality of barometric pressure sensors and a compliant layer covering the plurality of barometric pressure sensors and providing a measurement surface, the method for force inference comprising the following steps:

reading out pressure values from the plurality of barometric pressure sensors, and calculating a force map on the measurement surface based on the pressure values using a feed-forward neural network, the force map comprising a plurality of force vectors;

wherein the feed-forward neural network comprises a transfer network and a reconstruction network, wherein the transfer network maps the plurality of barometric pressure sensors to a plurality of virtual sensors of a finite element model of the sensor arrangement, wherein the reconstruction network maps the plurality of virtual sensors of the finite element model to the force map, wherein each virtual sensor of the plurality of virtual sensors comprises one or more virtual sensor points, each having a virtual sensor point value.

2. The method according to claim 1, wherein the reconstruction network was trained with the following steps performed before the force inference:

performing a plurality of simulations in the finite element model, each simulation of the plurality of simulations comprising simultaneous application of one or more simulated forces on a simulated measurement surface of the finite element model, thereby calculating a simulated force map on the simulated measurement surface, the simulated force map comprising a plurality of simulated force vectors, and calculating, with the finite element model, corresponding virtual sensor point values, and training the reconstruction network with the calculated simulated force maps and the corresponding calculated virtual sensor point values.

3. The method according to claim 2, wherein the reconstruction network was trained using a plurality of different simulated indenter shapes.

4. The method according to claim 2, wherein the reconstruction network was trained using a plurality of sizes of simulated indenters.

5. The method according to claim 2, wherein the reconstruction network was trained using a plurality of simulated forces having different shear force components.

6. The method according to claim 2, wherein the reconstruction network was trained using a plurality of simulated forces having different normal force components.

7. The method according to claim 1, wherein the transfer network was trained with the following steps performed before the force inference:

performing a plurality of force tests on the sensor arrangement, each force test comprising application of a force by one indenter on a position on the measurement surface of the sensor arrangement, simultaneously measuring a force applied by the indenter and simultaneously measuring pressure values with the plurality of barometric pressure sensors, for each force test, performing a corresponding simulation with the finite element model, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and calculating, with the finite element model, corresponding virtual sensor point values, and training the transfer network with the measured pressure values and the corresponding calculated virtual sensor point values.

8. The method according to claim 7, wherein the transfer network was trained using a plurality of different indenter shapes.

9. The method according to claim 7, wherein the transfer network was trained using a plurality of indenters with different sizes.

10. The method according to claim 7, wherein the transfer network was trained using a plurality of forces having different shear force components.

11. The method according to claim 7, wherein the transfer network was trained using a plurality of forces having different normal force components.

12. The method according to claim 1, wherein the feed-forward neural network directly maps the plurality of barometric pressure sensors to the force map.

13. The method according to claim 1, wherein the feed-forward neural network was trained with the following steps performed before the force inference:

performing a plurality of force tests on the sensor arrangement, each force test of the plurality of force tests comprising application of a force by one indenter on a position on the measurement surface of the sensor arrangement, simultaneously measuring a force applied by the indenter and simultaneously measuring pressure values with the plurality of barometric pressure sensors, for each force test, performing a corresponding simulation with a finite element model of the sensor arrangement, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the measured pressure values and the corresponding calculated simulated force maps.

14. The method according to claim 1, wherein each force vector comprises a normal force component, a first shear force component and a second shear force component.

15. A method for training a reconstruction network, wherein the reconstruction network maps virtual sensors of a finite element model of a sensor arrangement to a force map, the sensor arrangement comprising a plurality of barometric pressure sensors and a compliant layer covering the plurality of barometric pressure sensors and providing a measurement surface, the force map comprising a plurality of force vectors, wherein each virtual sensor comprises one or more virtual sensor points, each having a virtual sensor point value, wherein the reconstruction network is trained with the following steps:

performing a plurality of simulations in the finite element model, each simulation of the plurality of simulations comprising simultaneous application of one or more simulated forces on a simulated measurement surface of the finite element model, thereby calculating a simulated force map on the simulated measurement surface, the simulated force map comprising a plurality of simulated force vectors, and calculating, with the finite element model, corresponding virtual sensor point values, and training the reconstruction network with the calculated simulated force maps and the corresponding calculated virtual sensor point values.

16. A method for training a transfer network, wherein the transfer network maps barometric pressure sensors of a sensor arrangement to a plurality of virtual sensors of a finite element model of the sensor arrangement, the sensor arrangement comprising a plurality of barometric pressure sensors and a compliant layer covering the plurality of barometric pressure sensors and providing a measurement surface, wherein each virtual sensor comprises one or more virtual sensor points, each having a virtual sensor point value, wherein the transfer network is trained with the following steps:

performing a plurality of force tests on the sensor arrangement, each force test comprising application of a force by one indenter on a position on the measurement surface of the sensor arrangement, simultaneously measuring a force applied by the indenter and simultaneously measuring pressure values with the plurality of barometric pressure sensors, for each force test, performing a corresponding simulation with the finite element model, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and calculating, with the finite element model, corresponding virtual sensor point values, and training the transfer network with the measured pressure values and the corresponding calculated virtual sensor point values.

17. A method for training a feed-forward neural network, wherein the feed-forward neural network calculates a force map on a measurement surface of a sensor arrangement based on pressure values of barometric pressure sensors, the sensor arrangement comprising a plurality of barometric pressure sensors and a compliant layer covering the plurality of barometric pressure sensors and providing a measurement surface, the force map comprising a plurality of force vectors, wherein the feed-forward neural network is trained with the following steps:

performing a plurality of force tests on the sensor arrangement, each force test comprising application of a force by one indenter on a position on the measurement surface of the sensor arrangement, simultaneously measuring a force applied by the indenter and simultaneously measuring pressure values with the plurality of barometric pressure sensors, for each force test, performing a corresponding simulation with a finite element model of the sensor arrangement, each simulation comprising application of a simulated force on a simulated measurement surface of the finite element model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the measured pressure values and the corresponding calculated simulated force maps.

18. A force inference module for force inference of a sensor arrangement for sensing forces, the force inference module being configured to perform a method according to claim 1.

19. A sensor arrangement for sensing forces, the sensor arrangement comprising:

a flexible circuit board, a plurality of barometric pressure sensors being mounted on the flexible circuit board, a rigid core, which the flexible circuit board is wrapped around and mounted to, so that the flexible circuit board at least partially covers the rigid core with the barometric pressure sensors protruding away from the rigid core, a compliant layer covering the barometric pressure sensors and providing a measurement surface, and a force inference module according to claim 18.

* * * * *